United States Patent [19]
Abbott et al.

[11] Patent Number: 6,141,324
[45] Date of Patent: Oct. 31, 2000

[54] SYSTEM AND METHOD FOR LOW LATENCY COMMUNICATION

[75] Inventors: Ben Abbott, Providence, Utah; Rajesh Chhabria, Rancho Cordova, Calif.; Abhijit Dey, Provo, Utah

[73] Assignee: Utah State University, Logan, Utah

[21] Appl. No.: 09/145,194

[22] Filed: Sep. 1, 1998

[51] Int. Cl.$^7$ .......................................... H04J 3/14
[52] U.S. Cl. .............................. 370/236; 709/232
[58] Field of Search .................... 370/252, 229, 370/235, 236, 465, 522, 524; 709/232, 233, 234, 235

[56] References Cited

U.S. PATENT DOCUMENTS

| | | | |
|---|---|---|---|
| 5,633,859 | 5/1997 | Jain et al. | 370/236 |
| 5,659,541 | 8/1997 | Chan | 370/236 |
| 5,675,579 | 10/1997 | Kalampoukas et al. | 370/236 |
| 5,719,930 | 2/1998 | MacDonalde et al. | 370/236 |
| 5,777,984 | 7/1998 | Gun et al. | 370/236 |
| 5,892,754 | 4/1999 | Kompella et al. | 370/236 |

*Primary Examiner*—Min Jung
*Attorney, Agent, or Firm*—Trask Britt

[57] ABSTRACT

A low latency, high throughput communication system applicable to real-time communications, such as real-time audio and video, controls the total in-transit data between a transmitting application and a receiving application to a target amount using feedback. As a result, the system operates at about the same throughput as it does when modem and other buffers associated with the system are always full, but at a substantially lower latency and with the modem and other buffers less than full. The system is applicable to both modem-to-modem telephone communications and internet communications in accordance with the TCP and UDP protocols. The system includes a forward error correction and retransmission scheme for use with the UDP protocol, and also includes a scheduling protocol for use in association with virtual channels.

32 Claims, 15 Drawing Sheets

SYSTEM AND METHOD FOR LOW LATENCY COMMUNICATION

BACKGROUND OF THE INVENTION

1. Technical Field

This invention relates to communication protocols for modems and other communication devices and, more specifically, to systems and methods for implementing a low latency, high throughput communication protocol for direct modem-to-modem communication over telephone lines, internet communication, and other communication systems.

2. State of the Art

As shown in FIG. 1, a representative system 10 for transmitting data between computers includes a transmitting modem 12 that modulates data from a transmitting computer 14 and transmits the modulated data over a telephone system 16. A receiving modem 18 then receives and demodulates the modulated data for use by a receiving computer 20.

The performance of the representative data transmission system 10 can be characterized in terms of throughput, latency, and jitter. "Throughput" means the amount of data transmitted by the transmitting computer 14 during a given length of time. "Latency" means the amount of time it takes a portion of data (generally referred to as a "packet") transmitted by the transmitting computer 14 to reach the receiving computer 20. Further, "jitter" refers to the variation in latency, if any, occurring during the transmission and subsequent reception of a data packet.

In non-real-time applications, the most important performance characteristic for the data transmission system 10 is usually throughput. Thus, for example, when transmitting and receiving a facsimile via the system 10, the primary emphasis is placed on minimizing the total amount of time it takes to transmit the facsimile (i.e., maximizing throughput), with little or no emphasis being placed on minimizing the time it takes to transmit and receive the individual data packets that make up the facsimile (i.e., latency), or on minimizing variations in the time it takes to transmit and receive one data packet versus another (i. e., jitter).

In contrast, while real-time applications tend to place the same emphasis on maximizing throughput, they also typically place emphasis on minimizing jitter and latency. Consider, for example, a real-time audio transmission via the system 10. Bob speaks into a microphone (not shown) connected to the transmitting computer 14 and, after a certain transmission delay associated with the system 10, Mary hears Bob's voice coming out of a speaker (not shown) connected to the receiving computer 20. To hear Bob's voice in as "real" a manner as possible, Mary is not just concerned with minimizing the amount of time it takes the transmitting computer 14 to transmit Bob's voice (i.e., maximizing throughput): Mary is also concerned with minimizing jitter, because excessive jitter can cause the pitch at which Mary hears Bob's voice to vary noticeably and unnaturally, much like the pitch of music from a phonograph varies unnaturally if the phonograph's turntable varies between too slow and too fast. Also, if the transmission described is a two-way transmission such that Mary can also speak to Bob, then both Mary and Bob are also concerned with minimizing latency, because excessive latency will cause an unnatural delay for both Bob and Mary between statements they make and responses they receive to those statements.

Accordingly, at least three conventional communication protocols have been developed to address the need for low jitter and low latency in such real-time applications.

The first protocol, referred to as the "H.324 multimedia communication standard," suggests turning off the error correction and data compression hardware features in modern modems in order to eliminate the delays associated with those features. Unfortunately, turning these hardware features off necessitates implementing the same features in software, which creates a heavy computational burden for a computer processor. In addition, removing hardware error correction and data compression requires that start and stop bits be added to the data stream transmitted by a modem, thereby reducing the throughput of the modem by at least 20%.

The second protocol, referred to as the "V.80 standard," suggests a system in which the transmitting computer 14 polls the transmitting modem 12 to determine the amount of unsent data residing in the internal buffers of the modem 12. The transmitting computer 14 then controls the maximum threshold of the internal buffers (i.e., the maximum amount of unsent data allowed in the buffers) accordingly. While the V.80 standard does control latency in the transmitting modem 12 by controlling the maximum threshold of the internal buffers of the modem 12, it does not take into account the need to control latency associated with buffers in the computer operating systems of the transmitting and receiving computers 14 and 20, or the need to control latency associated with buffers in the telephone system 16. The V.80 standard also suffers from its need to be implemented in hardware, which means that it cannot be added to the vast majority of modems currently in use.

The need for low jitter and low latency also arises when considering real-time applications over the internet. The third protocol, referred to as the "H.323 standard," has been developed to address low latency communication over the internet. This standard proposes the use of another protocol, the User Datagram Protocol (UDP), for real-time communications over the internet in place of the more commonly used Transmission Control Protocol (TCP). The H.323 standard proposes use of the UDP for real-time applications instead of the TCP because the UDP eliminates acknowledgment transmissions from a receiver back to a transmitter that are required by the TCP, thereby reducing congestion and accelerating the transmission of real-time data from transmitter to receiver. Unfortunately, one of the requirements of many real-time applications is guaranteed delivery of transmitted data, so the lack of acknowledgment transmissions in the UDP makes it an unreliable choice for internet-based real-time applications because the delivery of transmitted data cannot be guaranteed without acknowledgments. Therefore, there is a need in the art for a system and method for low latency communication over modems, the internet, and similar communication systems. Such a system and method should avoid the problems associated with the H.323, H.324, and V.80 standards described above.

SUMMARY OF THE INVENTION

In one low latency method of operating a communication system in accordance with this invention, a target amount of in-transit data with which the communication system is to be operated is first selected. "In-transit data" refers to, inter alia, any data sent by a computer application, for example, of the communication system and intended for, but not yet received by, for example, another computer application of the communication system that is separated from the sending computer application by a communication channel, such as, for example, a telephone line or the internet. The target amount of in-transit data is selected so the communication system will operate with a relatively high throughput and a relatively low latency. With the target amount of in-transit data selected, data transmission via the communication system begins. Feedback is then received from the communication system indicating the amount of in-transit data present therein as a result of the transmission of data. In response to this feedback, the transmission of data is controlled so the amount of in-transit data present in the communication system does not exceed the selected target amount of in-transit data.

In other embodiments of this invention, the above-described method is stored on a computer-readable storage medium, is implemented in a communication system involving virtual channels, and is implemented in an internet-based communication system involving the TCP/IP and UDP/IP protocols.

In still another embodiment of this invention, an electronic system, such as a computer, includes a device (e.g., a modem) for transmitting data to a receiving site of a communication system via a communication channel of the system. Another device of the electronic system is adapted by a computer program, for example, to select a target amount of in-transit data with which the communication system is to be operated, to receive feedback from the receiving site indicating the amount of in-transit data present in the communication system resulting from the transmitting of data, and to control the transmitting of data via the communication channel in response to the received feedback so the amount of in-transit data present in the communication system does not exceed the selected target amount of in-transit data.

In yet another embodiment of this invention, a communication system incorporates the electronic system described above as a transmitting site, and also incorporates a receiving site having a device for providing the described feedback to the transmitting site.

DETAILED DESCRIPTION OF THE ILLUSTRATED EMBODIMENTS

A heretofore unknown relationship between average latency and average throughput in modem-to-modem communications over telephone lines and in communications across the internet will be described first. A system for implementing the inventors' low latency protocol, which exploits this relationship, in modem-to-modem communications across telephone lines will then be described, followed by a description of implementations of this invention involving virtual channels and internet communications.

The Throughput-Latency Relationship

Conventional thinking regarding maximizing throughput is that maximum throughput can only be achieved by writing data to a modem more quickly than the modem can transmit the data. This ensures that the internal buffers in the modem are always full and, so the thinking goes, ensures that maximum throughput is achieved, because data is always waiting in the buffers whenever the next opportunity to transmit arises.

Figure 2:
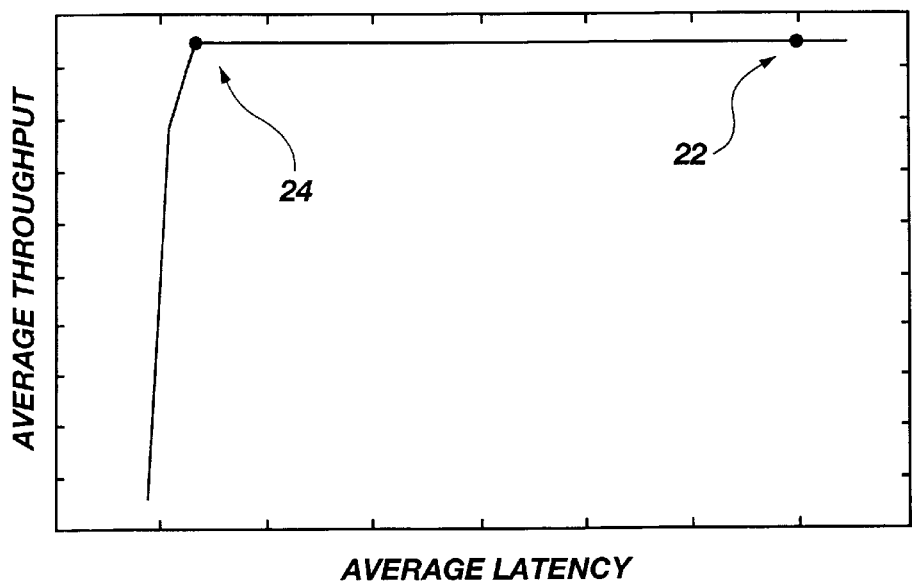
FIG. 2 is a graph illustrating the relationship the inventors have discovered between average throughput and average latency in modem-to-modem communications across telephone lines.

As shown in FIG. 2 in a graph of average throughput versus average latency in modem-to-modem communications across telephone lines, a point of operation 22 at which the internal buffers of a modem are full does indeed maximize average throughput, but it does so at the expense of high average latency. As can be seen from the graph, a point of operation 24 (referred to as the "knee" point) at which the internal buffers of the modem are less than full still maximizes average throughput, yet it also provides a much lower average latency. As discussed earlier, minimizing latency and, hence, jitter, are important to real-time applications; and it is apparent from the graph of FIG. 2 that this can be achieved with little or no expense in terms of average throughput by operating the modem at the knee point 24, instead of at the point 22 recommended by conventional thinking.

Figure 3:
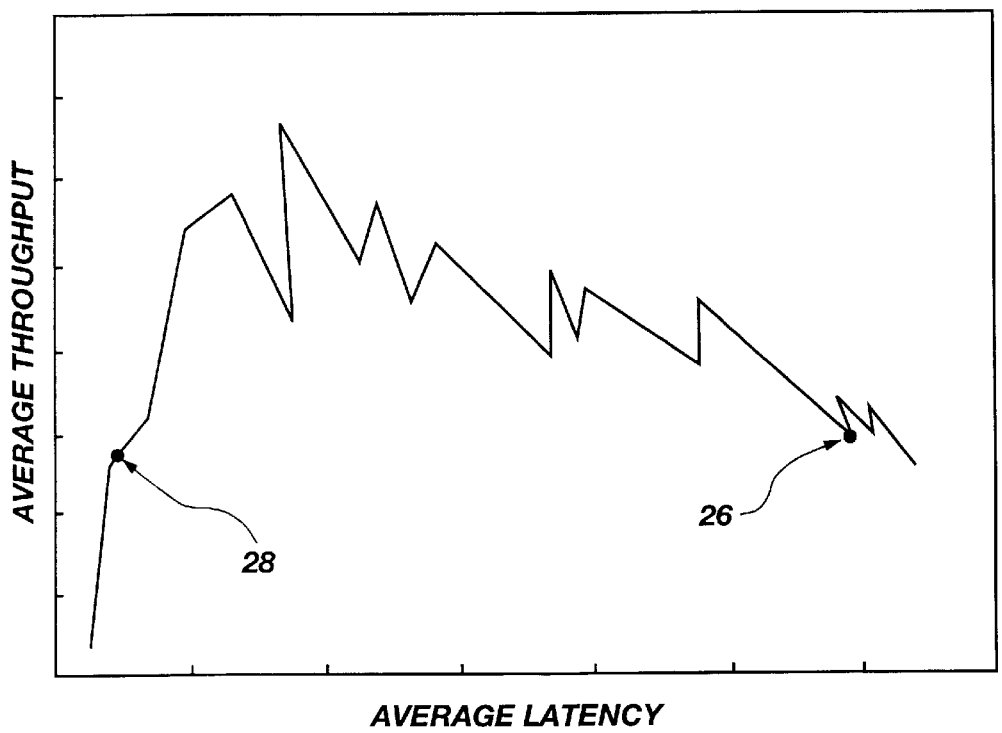
FIG. 3 is a graph illustrating the relationship the inventors have discovered between average throughput and average latency in internet communications.

Similarly, as shown in FIG. 3 in a graph of average throughput versus average latency in internet communications, a point of operation 26 at which the internal buffers of a modem are full results in high average latency. In contrast, a point of operation 28 (also referred to as a "knee" point) at which the internal buffers of the modem are less than full still provides about the same average throughput as operation point 26, yet it also provides a much lower average latency.

Accordingly, this invention is directed toward devices and methods for operating a communication system including, for example, a modem-based system, at the knee point in average throughput versus average latency.

The Low Latency Protocol

Figure 4:
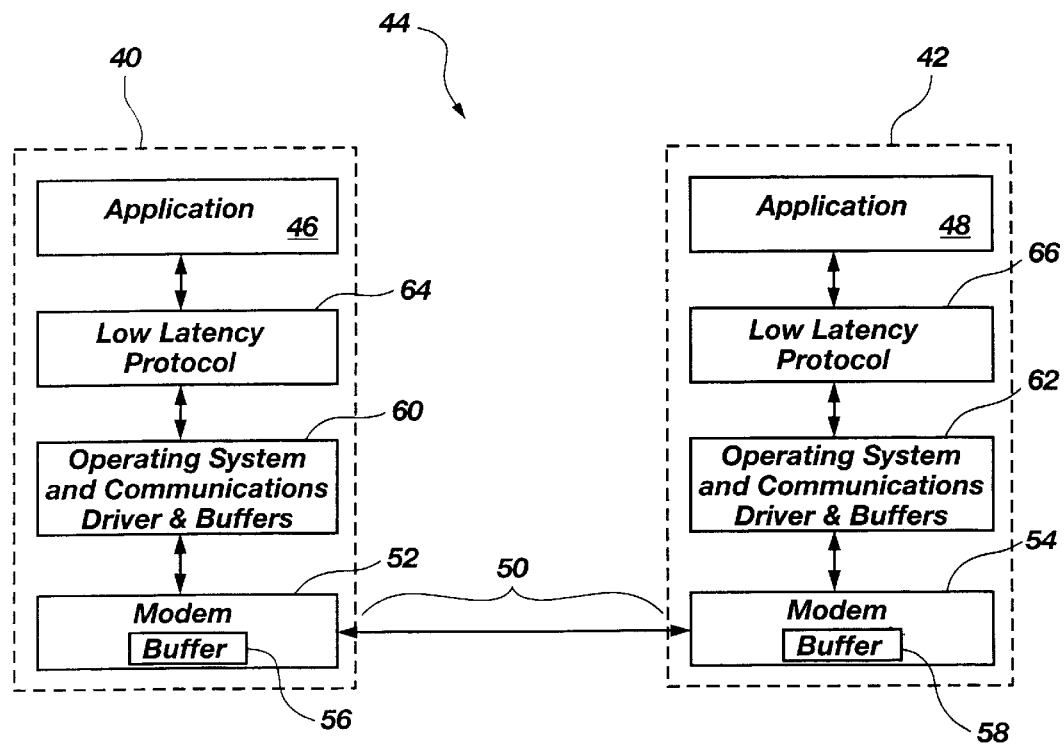
FIG. 4 is a block diagram illustrating a modem-to-modem communication system in accordance with this invention.
Figure 1:
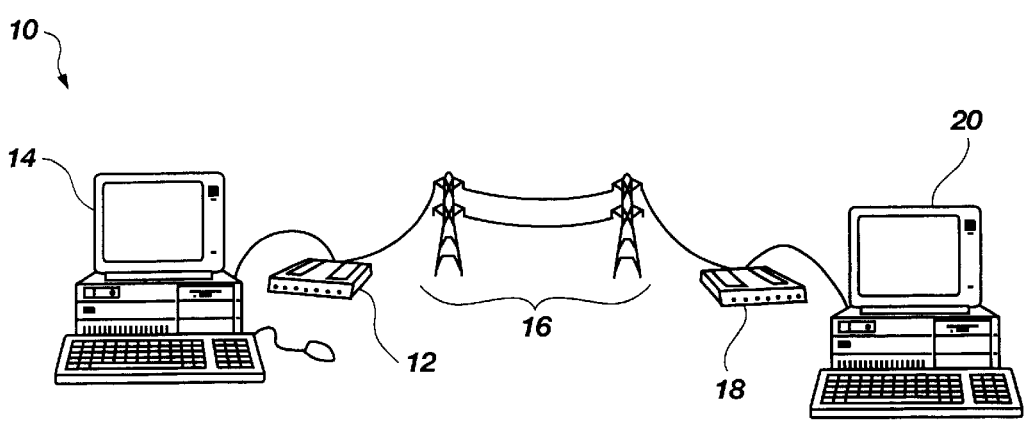
FIG. 1 illustrates a conventional modem-based system for transmitting data between computers.

As shown in FIG. 4, a pair of computers 40 and 42 in a communication system 44 in accordance with this invention includes a pair of computer applications 46 and 48 passing data between one another via a communication channel 50.

Although this invention will be described with respect to computers, those having skill in the technical field of this invention will understand that the invention is equally applicable to communications between any type of electronic devices requiring low latency and high throughput and exhibiting knee point characteristics similar to those illustrated in FIGS. 2 and 3. Also, it will be understood that this invention is applicable to any computer application that exchanges data with another computer application via a communication channel, whether the applications are implemented in software, hardware, or both. Finally, it will be understood that this invention is applicable to any communication channel including, for example, telephone lines, switching equipment, internet routers, cable lines, cellular, satellite, and other digital airwave channels, T1 lines, and the like.

Modems 52 and 54 on either end of the communication channel 50 include internal buffers 56 and 58 for storing yet-to-be-transmitted data they receive from the operating systems, communications drivers, and associated buffers 60 and 62 in each of the computers 40 and 42. Of course, it will be understood the this invention is not limited to modem-based systems.

This "yet-to-be-transmitted" data originates in the applications 46 and 48, and its flow to the operating systems, communication drivers, and associated buffers 60 and 62 is monitored and controlled by a low latency protocol 64 and 66 so as to ensure operation of the system 44 at the knee point previously described. It will be understood that while the low latency protocol 64 and 66 will be described here as being implemented in software, it can also be implemented in hardware, or a combination of hardware and software.

Figure 5:
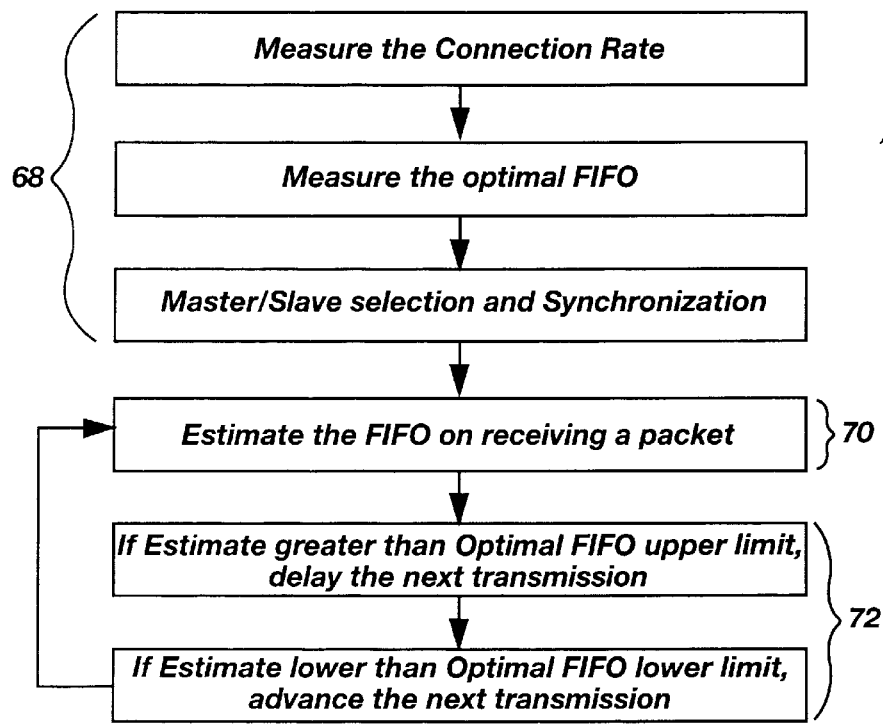
FIG. 5 is a flow chart illustrating a low latency protocol implemented in the communication system of FIG. 4.

As shown in more detail in FIG. 5, the low latency protocol 64 (identical to the protocol 66 (FIG. 4)) generally includes a series of startup procedures 68, followed by a loop including a procedure 70 for estimating the in-transit data (referred to as the "FIFO") between the computer applications 46 and 48 (FIG. 4), and a procedure 72 for adjusting the data transmission rate in accordance with the estimated FIFO in order to operate the system 44 (FIG. 4) at the knee point as described above.

It should be understood that the FIFO includes any data sent by one of the applications 46 and 48 and intended for, but not yet received by, the other of the applications 46 and 48. Thus, for example, the FIFO includes data residing in operating system and communication driver buffers 60 and 62 (FIG. 4), modem buffers 56 and 58 (FIG. 4), and any buffers associated with the communication channel 50 (FIG. 4).

The Startup Procedures

Figure 6A:
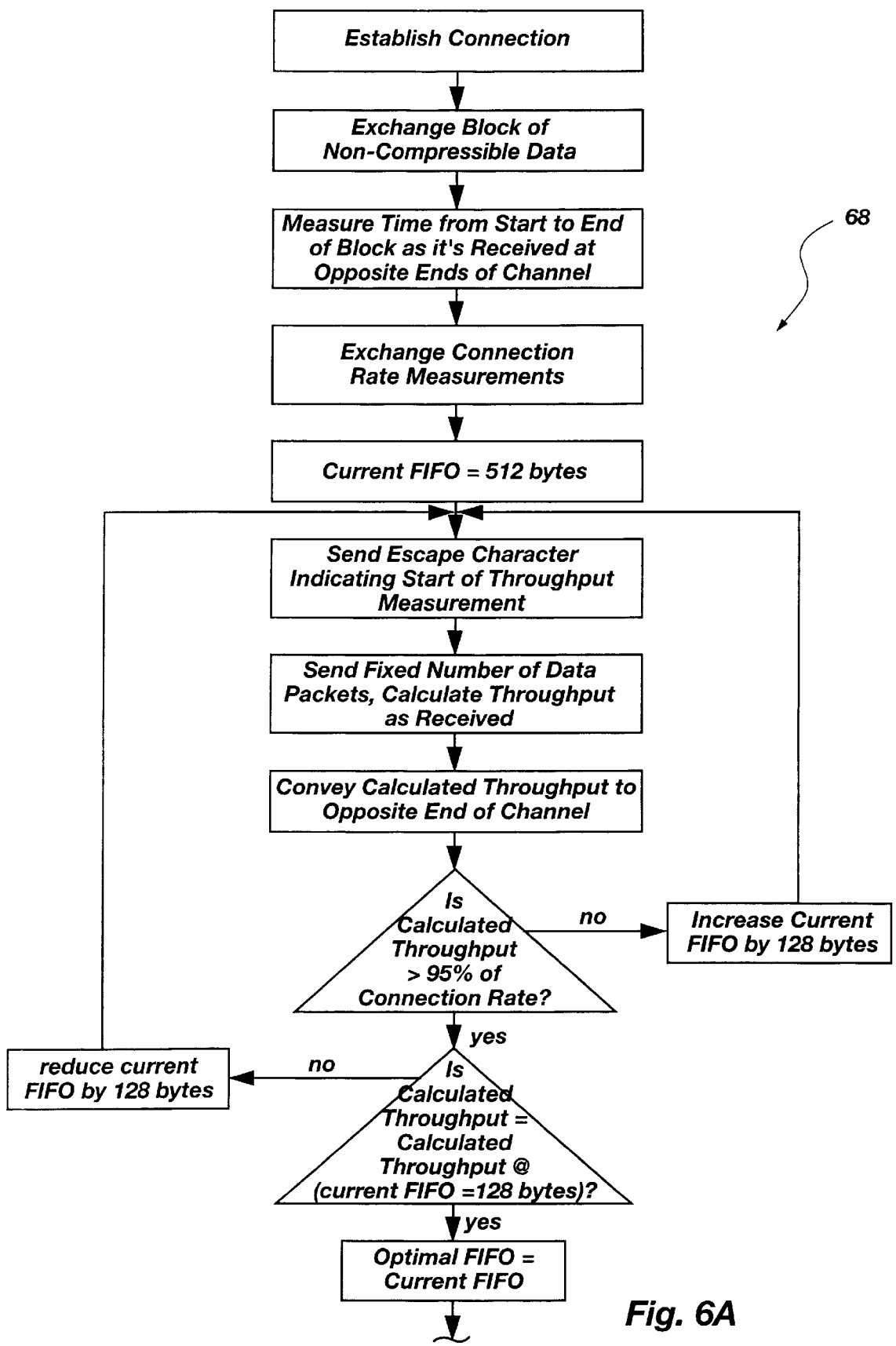
FIGS. 6A and 6B are flow charts illustrating startup procedures in the low latency protocol of FIG. 5.

As shown in FIG. 6A, the startup procedures 68 begin with the modem 52 (FIG. 4) establishing a connection with the modem 54 (FIG. 4). The modems 52 and 54 then exchange a block of non-compressible data (e.g., 3,600 bytes), and the connection rate of the modem 54 is calculated by measuring the time from the beginning to the end of the block as it is received by the modem 52. The connection rate of the modem 52 is calculated in a corresponding manner as the block is received by the modem 54. The calculated connection rates are then exchanged by the modems 52 and 54 so each knows its own connection rate.

With the connection established and the connection rates calculated and exchanged, the startup procedures 68 then determine the knee point of operation, also referred to as the "Optimal FIFO." Initially, the FIFO is controlled (in a manner that will be described below) at a default value of 512 bytes, although other default values will work as well. To measure the throughput at this current FIFO, an escape character is sent by the modem 52 indicating the start of measurement. The modem 52 then transmits a fixed number of data packets, and the throughput achieved by the modem 52 is calculated as the data packets are received by the modem 54. This calculated throughput is then transmitted by the modem 54 back to the modem 52. If the calculated throughput is less than 95% of the connection rate, then the current FIFO is increased by 128 bytes, and the throughput measurement is repeated. If, instead, the calculated throughput is greater than 95% of the connection rate, and the calculated throughput at the current FIFO is the same as the calculated throughput at the preceding FIFO, then the value of the current FIFO is assigned to the Optimal FIFO. Otherwise, the current FIFO is decreased by 128 bytes, and the throughput measurement is repeated.

Using this algorithm, the Optimal FIFO for the connection established between the modems 52 and 54 is determined. Pseudo code for this algorithm is as follows:

```
Current FIFO = 512 bytes
While (MeasurementInProgress)
{    Measure Current Throughput with FIFO controlled at Current FIFO;
     if (Current Throughput > 0.95 × ConnectionRate)
          then   { if (previous Throughput measured at
                    [Current FIFO − 128 bytes] = = Current Throughput)
                    then   { Optimum FIFO = Current FIFO;
                             MeasurementInProgress = FALSE;
                           }
                    else   { decrease Current FIFO by 128 bytes }
                 }
          else { increase Current FIFO by 128 bytes }
}
```

Of course, it should be understood that the default FIFO value of 512 bytes, the step-up or step-down FIFO value of 128 bytes, and the threshold value of 95%, all described above, are representative values only, and this invention is not limited to using these values in operation.

Figure 6B:
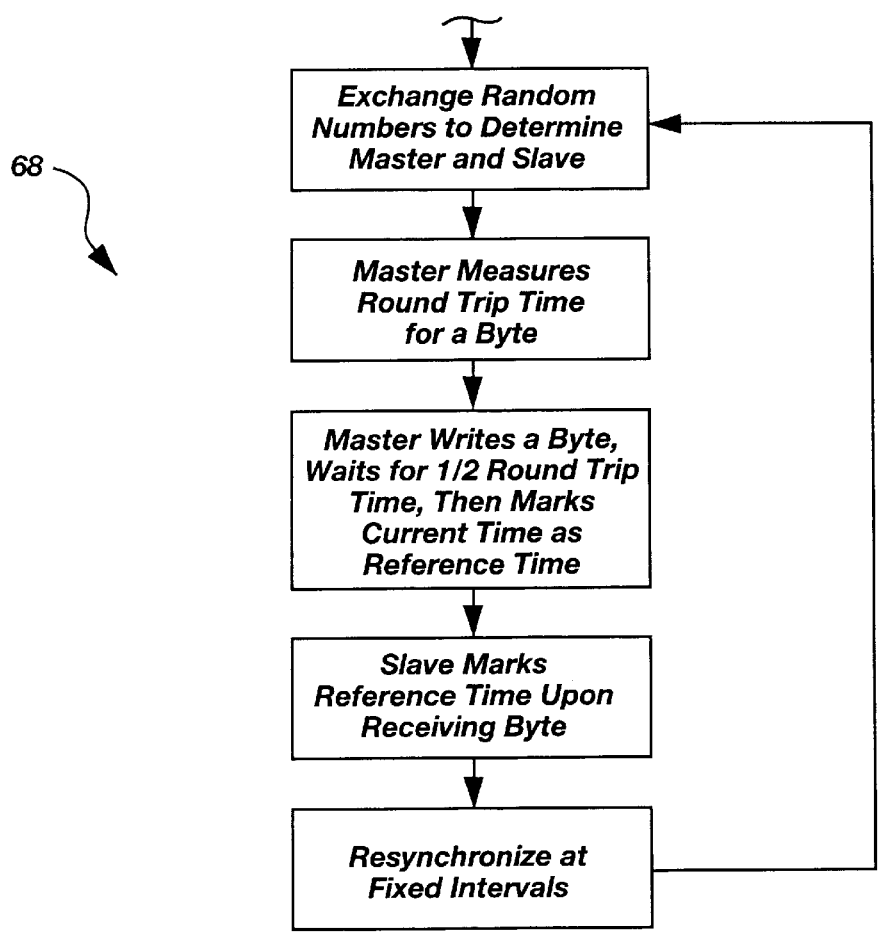

As shown in FIG. 6B, once the Optimal FIFO has been determined, the startup procedures 68 continue with the modems 52 and 54 exchanging random numbers to elect one the master and the other the slave. The master (e.g., the modem 52) then transmits a byte to the modem 54, which retransmits the byte back to the modem 52. The round trip time is then calculated. The master then transmits a second byte, waits for half the round trip time, and then flags the current time at that point as the reference time. The slave marks the current time upon receiving the second byte as the reference time. At this point, the two modems 52 and 54 are synchronized in time.

It should be noted that there is an implicit assumption in the synchronization process described above that the trip time from the modem 52 to the modem 54 is the same as the trip time from the modem 54 back to the modem 52. This generally won't be the case exactly, but the synchronization process described above is a very low overhead process that is sufficient for the needs of this invention. Other, more accurate synchronization methods may, of course, be used in connection with this invention. Also, it should be noted that drift in the independent clocks of the computers 40 and 42 (FIG. 4) generally necessitates re-synchronizing the modems 52 and 54 at fixed intervals (e.g., every thirty minutes) for long connection sessions.

Estimating the FIFO

Figure 7:
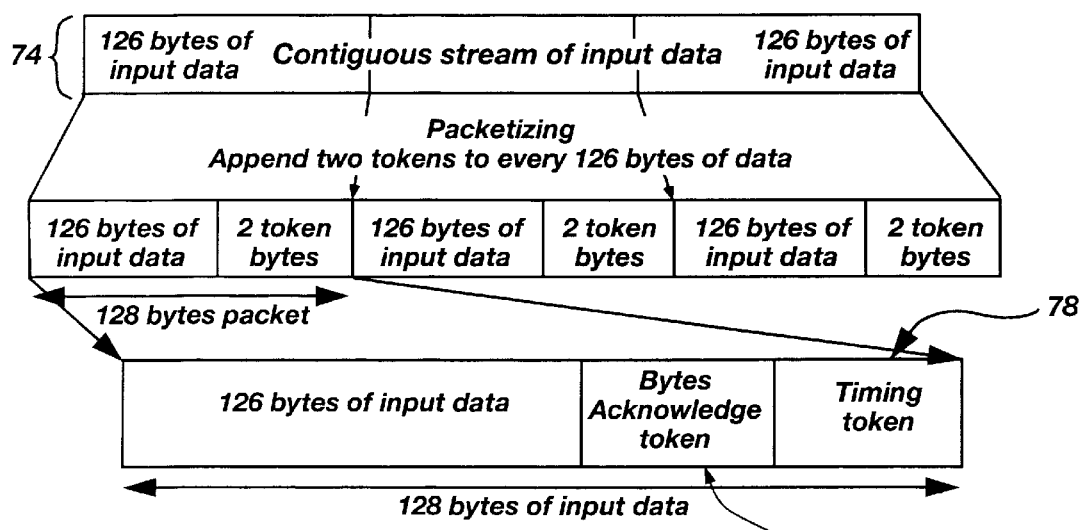
FIG. 7 illustrates the packetizing and tokenizing of data in accordance with this invention.

As shown in FIG. 7, the process 70 (FIG. 5) for estimating the FIFO begins during the transmission of data by the modem 52. A contiguous stream of input data 74 from the application 46 (FIG. 4) is packetized by subdividing the data into 126 byte portions. A one byte acknowledgment token 76 and a one byte timing token 78 are then added to each 126 byte portion to form a series of 128 byte packets for transmission. The acknowledgment and timing tokens 76 and 78 will be explained in more detail below.

Figure 8:
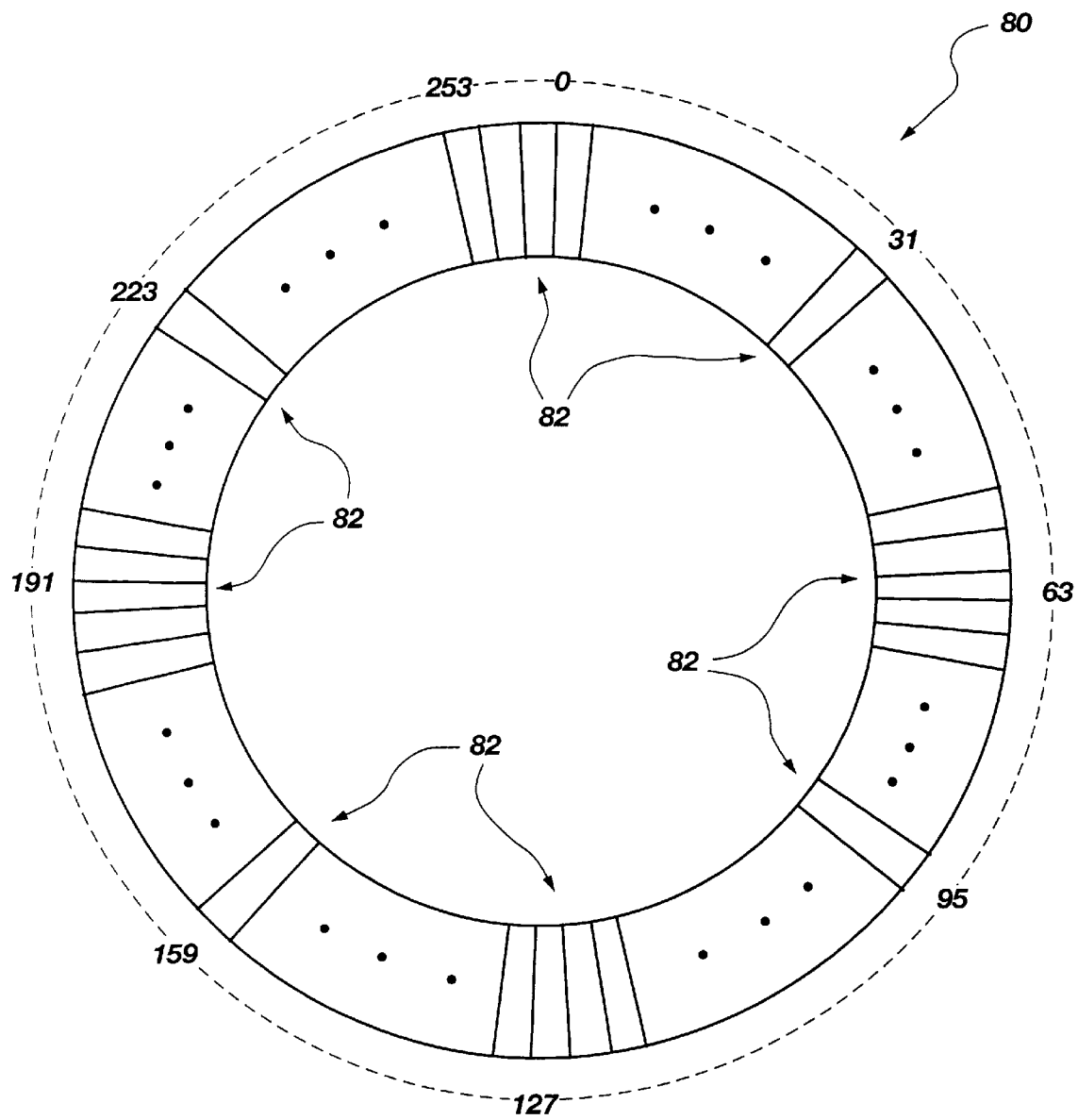
FIG. 8 is a diagram illustrating a circular buffer in accord with this invention.

As shown in FIG. 8, a circular, time-indexed buffer 80 in the computer 40 (FIG. 4) stores a record of the total number of bytes transmitted by the modem 52 in each of its 256 cells 82. Each of the cells 82 is indexed according to the time its data was written, and each of the cells 82 is overwritten every 8 seconds. Of course, this invention is not limited to a specific number of cells or a specific number of seconds represented by those cells.

An example should help explain the contents of the buffer 80. Suppose that 9.0 seconds into a communication session the modem 52 has transmitted a total of 8 kilobytes. Consequently, a number representing 8 kilobytes would be stored in the cell with index number 31. At 12.0 seconds after the beginning of the session a number representing the total number of bytes transmitted since the beginning of the session (e.g., 14 kilobytes) would be stored in the cell with index number 127. This process occurs continuously so that every cell always contains the total number of bytes transmitted by the modem 52 from the beginning of the communication session to a particular point in time represented by the index number associated with the cell. Since the buffer 80 is overwritten during transmission, the total length of the buffer 80 in seconds (e.g., 8 seconds long) must be selected to be longer than the maximum latency typically experienced by a transmitted packet. The role of the circular buffer 80 will be explained in further detail below.

The modem 54 (FIG. 4) acknowledges the receipt of data packets from the modem 52 (FIG. 4) by adding acknowledgment and timing tokens to data packets it is transmitting to the modem 52. Specifically, the acknowledgment token is a one byte token that represents the number of bytes received by the modem 54 since the last acknowledgment token was sent. The number of bytes received is represented in the acknowledgment token in units of 64 bytes so that, for example, if 128 bytes had been received since the last acknowledgment token was sent, the current acknowledgment token would be [00000010] in binary. The maximum number of received bytes that can be acknowledged with one acknowledgment token is ($2^8 \times 64 = 16$ kilobytes). Of course, acknowledgment tokens having more or less than 8 bits (i.e., one byte), and more or less than 64 bytes represented by each unit, may also be used in association with this invention.

The timing token is a one byte token that is equal to the n least significant bits of T, which is calculated as, $$T = [(\text{Current Time} - \text{Reference Time}) \times 2^n] \div S$$

where "n" is the number of bits in the timing token (e.g.,8), and "S" is the total number of seconds in the circular buffer 80 (FIG. 8) (e.g., 8). Because the timing token only uses the n least significant bits of T, the timing token "wraps around" every S seconds, just like the circular buffer 80. Thus, for example, if the Current Time is 8.5 seconds and the Reference Time is 0.0 seconds, then T=[100010000] in binary, and the timing token is [00010000] in binary.

When the modem 52 receives a data packet from the modem 54 containing an acknowledgment token and a timing token, the protocol 64 (FIG. 4) causes the computer 40 to add the total number of acknowledged bytes represented by the acknowledgment token to an acknowledgment buffer (not shown) that stores the total number of acknowledged bytes, and then causes the computer 40 to update a timing buffer (not shown) that stores the most recent timing token received. The protocol 64 then causes the computer 40 to subtract the total number of acknowledged bytes, stored in the acknowledgment buffer, from the total transmitted byte data stored in the cell in the circular buffer 80 (FIG. 8) indexed by the timing token stored in the timing buffer. As a result, the total number of bytes acknowledged by the modem 54 as of the time represented by the most recent timing token received by the modem 52 is subtracted from the total number of bytes transmitted by the modem 52 as of that same time. The resulting difference is a relatively accurate estimate of the FIFO, i.e., the total number of bytes transmitted by the modem 52, but not yet received by the modem 54, as of the time represented by the most recent timing token stored in the timing buffer.

The process described above for estimating the FIFO is repeated every time a new data packet is received by the modem 52 (and by the modem 54).

Controlling the FIFO

Referring once again to FIG. 5, once the procedure 70 for estimating the FIFO is complete, the procedure 72 for adjusting the FIFO as necessary begins. The procedure 72 operates as follows:

Upper Target FIFO = Optimal FIFO + 64 bytes;
Lower Target FIFO = Optimal FIFO − 64 bytes;
If (Estimated FIFO > Upper Target FIFO),
    then delay transmission of next packet by D seconds, where
        D = (Estimated FIFO − Optimal FIFO) ÷ Connection Rate
Else if (Estimated FIFO < Lower Target FIFO),
    then advance transmission of next packet by A seconds, where
        A = (Optimal FIFO − Estimated FIFO) ÷ Connection Rate
Else do not delay or advance transmission of next packet Thus, a 128 byte "window" is created around the Optimal FIFO between the Upper Target FIFO and the Lower Target FIFO, and transmission of the next packet is delayed or advanced if the Estimated FIFO is outside that window. Although the 128 byte size of the window described here has been found useful, other-sized windows may be used in conjunction with this invention, or the invention may be operated with no window at all (although this may lead to undesirably frequent adjustments in the transmission rate). Also, because feedback from any change in transmission rate takes an amount of time equal to the round-trip time of a data packet to arrive at the site of the change, all changes in transmission rate are only implemented after a time equal to the round-trip time of a data packet has passed since the last change was implemented, in order to avoid oscillations in the control of the FIFO.

Experiments have shown the efficacy of the above-described low latency protocol. The results of one such experiment, obtained using the system 44 of FIG. 4, are summarized in the table below.

TABLE 1

| Measurements for 128 byte packets | Without Protocol | With Protocol |
|---|---|---|
| Average latency (msec) | 710 | 200 |
| Max–Min latency (msec) | 280 | 120 |
| st. dev. of latency (msec) | 80 | 20 |
| Average Throughput (bps) | 27,015 | 26,850 |

A number of variations are possible in the low latency protocol described above. For example, all communications between the modems 52 and 54 (FIG. 4) can be implemented in a dedicated communication channel separate from the channel 50 shown in FIG. 4. This dedicated communication channel can be a dedicated virtual channel (such as those that will be described below), or a dedicated physical channel (such as a separate telephone line connection, etc.) Also, other methods for passing acknowledgment and timing tokens can be used, such as identifying such tokens in a non-packetized data stream by escape characters. Finally, if traffic between the modems 52 and 54 is almost or entirely one-way, the low latency protocol can include a procedure for automatically generating data packets at selected intervals in the opposite direction so the transmitting modem can receive the acknowledgment and timing tokens discussed above.

Virtual Channels

Multiple communication sessions between multiple computer applications can be multiplexed together over a single physical communication channel. Such sessions are referred to as "virtual" channels. These channels are particularly useful in real-time applications (e.g., videoconferencing), where multiple communication sessions involving different data types (e.g., voice, video, and text data) may be on-going virtually simultaneously.

Figure 9:
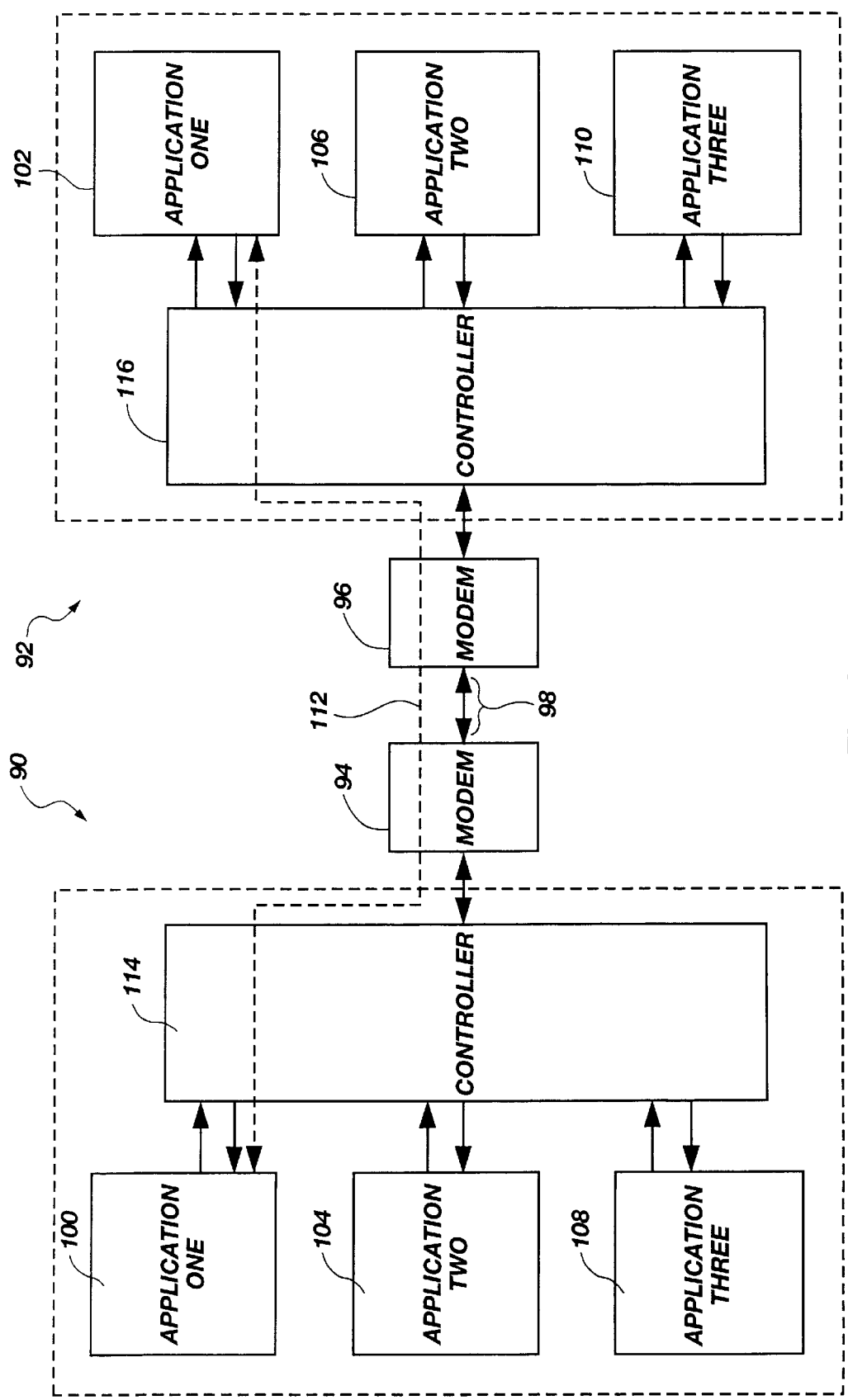
FIG. 9 is a block diagram illustrating a modem-to-modem communication system having virtual channels in accordance with this invention.

As shown in FIG. 9, an implementation of this invention involving virtual channels includes a pair of computers 90 and 92 communicating via modems 94 and 96 over a communication channel 98, such as a telephone line. Paired computer applications (100, 102), (104, 106), and (108, 110) communicate with one another over the communication channel 98 via virtual channels (one such channel 112 is shown between applications 100 and 102).

Controllers 114 and 116 implement the low latency protocol described above for each of the three virtual channels (only one of which is shown). In addition, when transmitting data, the controllers 114 and 116 add a virtual channel header at the start of each data packet associated with a particular virtual channel. This header identifies the particular virtual channel associated with the transmitted packet. Upon receiving a data packet marked with a virtual channel header, the controllers 114 and 116 route the packet to the computer application associated with that virtual channel (e.g., computer application 100).

In order to allocate time on the communication channel 98 among the three virtual channels, a cost function is created for each virtual channel. Such cost functions determine the transmission priority of data packets from different virtual channels that have been waiting for transmission the same amount of time, and such functions also determine how quickly a data packet moves up in transmission time as it waits to be transmitted. For example, cost functions for audio, video, and data channels in a videoconferencing application may be as follows:

Audio Cost=(Delay−0.3)×2.5

Video Cost=(Delay−1.0)×1.25

Data Cost=(Delay−3.0)×1.0, where "Delay" is the amount of time a data packet has been ready for transmission plus the estimated amount of time it will take the data packet to be received.

In using the cost functions, the controllers 114 and 116 schedule the transmission of data packets from the different virtual channels in a manner such that the total cost associated with all the data packets next in line for transmission from the different virtual channels is minimized. An example may help to clarify this. Suppose, for example, that the Delay for the next audio channel data packet is 1.3 seconds, the Delay for the next video channel data packet is 2 seconds, and the Delay for the next data channel data packet is 3 seconds. As a result, the current Audio Cost is 2.5, the current Video Cost is 1.25, and the current Data Cost is 0.0. Accordingly, the controller 114 or 116 would transmit the next data packet from the audio channel so as to minimize the total of the Audio, Video, and Data Costs, after which it would calculate new Audio, Video, and Data Costs to select the next data packet for delivery. Of course, other schemes for scheduling delivery of data from different virtual channels also fall within the scope of this invention.

The controllers 114 and 116 may be augmented by adding an admission control protocol to the channel scheduling protocol described above. An admission control protocol would control whether a new virtual channel can be added by determining if the throughput, average latency, and average jitter requirements of the new channel can be accommodated in view of the capacity of the communication channel 98 and the requirements of any already established virtual channels. Also, means may be provided for dynamically altering the cost functions for each virtual channel during a communication session so that performance can be optimized for that session.

An Internet Application

Figure 10:
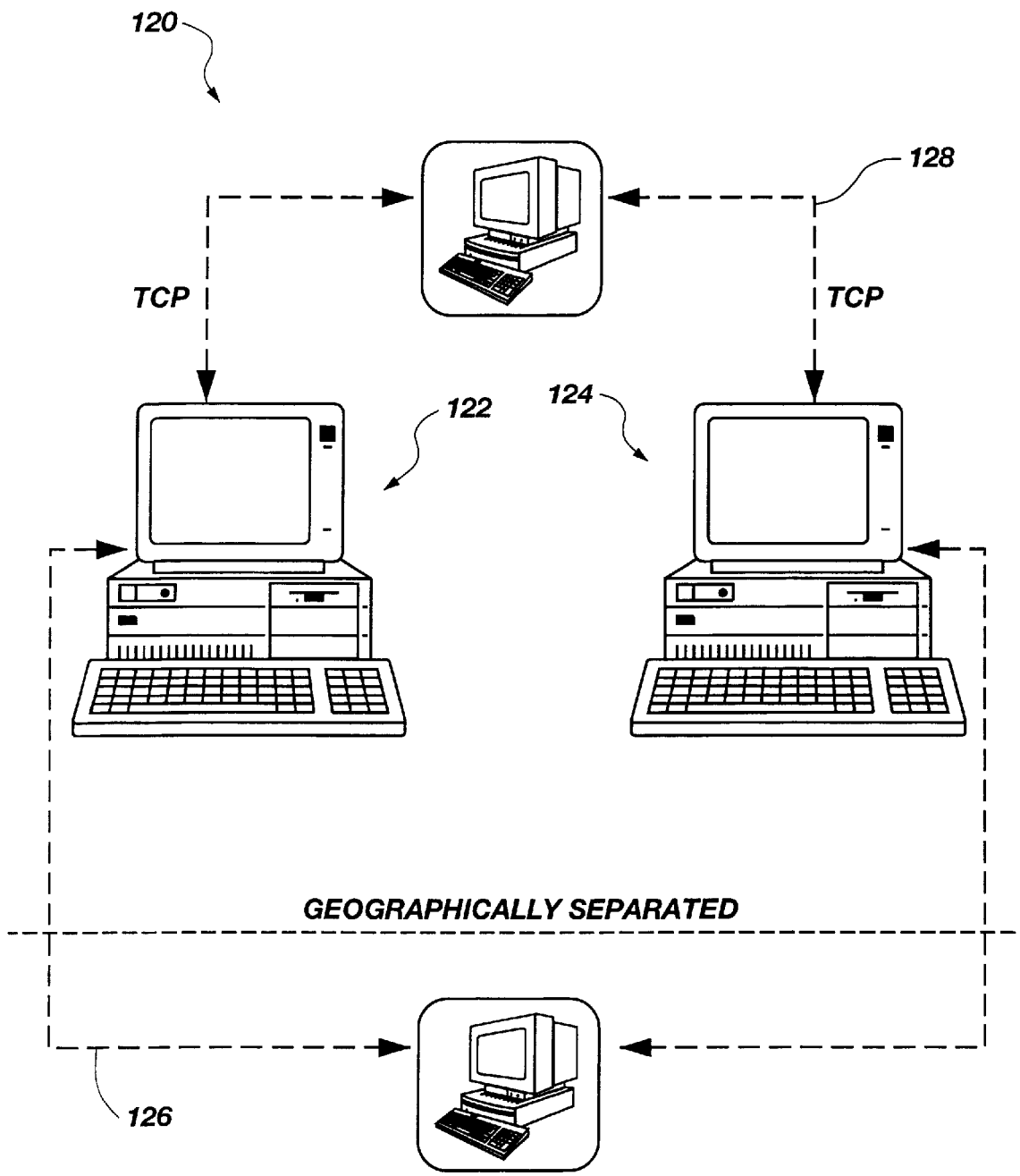
FIG. 10 is a diagram illustrating an internet-based implementation of this invention.

As shown in FIG. 10, an internet-based communication system 120 in accordance with this invention includes computers 122 and 124 communicating data with one another over an internet-based connection 126. For purposes of this description, the computers 122 and 124 may be considered as being similar to the computers 40 and 42 of FIG. 4 with respect to their implementation of the low latency protocol, except that the computers 122 and 124 may dispense with the need for modems if their connection to the internet is a direct T1 connection or the like.

Low latency protocols implemented in the computers 122 and 124 in accordance with this invention communicate with one another over an acknowledgment TCP connection 128 separate from the connection 126. Of course, the low latency protocols implemented in the computers 122 and 124 may communicate with one another in other ways, including, for example, over the connection 126 using the token or escape character methods previously described.

Separate TCP and UDP implementations of this invention will now be described.

A TCP/IP Implementation

Referring once again to FIG. 10, the connection 126 may be a TCP/IP connection. In this implementation, the low latency protocol is implemented as described above with respect to FIGS. 1–8, except that most of the protocol is implemented using a receiver software thread implemented at the receiving computer, and a sender software thread and handleAck software thread implemented at the transmitting computer.

The sender thread operates in accordance with the following pseudo-code:

```
{   if ((# Packets Sent − # Packets Delivered) < Optimal FIFO)
    then  { Send packets over the TCP/IP connection;
            Read the transmission time and update count of
            # Packets Sent;
          }
    else wait
}
```

Thus, packets continue to be sent by the sender thread until the FIFO exceeds the Optimal FIFO, at which time the sender thread delays transmission of the next packet until the FIFO drops below the Optimal FIFO.

The receiver thread receives packets from the sender thread and sends acknowledgments to the handleAck thread (described below) over the acknowledgment connection 128. Below is the pseudo-code for the receiver thread.

```
{   Read data packets received over the TCP/IP connection;
    Read the time of reception for each packet;
    Copy the received packets into the receiver buffer;
    Update the # Received Packets;
    Send acknowledgment packets through the TCP acknowledgment
      connection
}
```

In order for the sender thread in the transmitting computer to keep track of acknowledgments on the sender side a handleAck thread is provided that handles the acknowledgment packets received from the receiver thread in the receiving computer. Pseudo-code for this thread is given below.

```
{   Receive acknowledgment packets from the receiver thread;
    Read the time of receipt;
    Update the count of # Packets Delivered
}
```

A UDP/IP Implementation

Referring once again to FIG. 10, the connection 126 may be a UDP/IP connection. In this implementation, the low latency protocol is implemented as described above with respect to FIGS. 1–8, except that most of the protocol is implemented using a receiver software thread and consumer software thread implemented at the receiving computer, and a sender software thread and handleAck software thread implemented at the transmitting computer. Also, the UDP/IP implementation requires a forward error correction and retransmission technique in order to compensate for the lack of acknowledgment traffic in the UDP/IP protocol, as will be described below.

Pseudo-code for the sender thread is as follows:

```
{   while ((# Packets Sent – # Packets Delivered) < Optimal FIFO)
    {   switch (Last Transmission Status)
        {   case Normal:
                Form the next Message with the next three sequential
                  packets;
            case Retransmission Needed:
                Form the next Message with the Packet to be
                  retransmitted and the next two sequential packets;
        }
        Send the formed Message over the UDP/IP connection;
        Update # Packets Sent
    }
    if ((# Packets Sent – # Packets Delivered) ≧ Optimal FIFO)
    then { sleep and wait to be woken by the handleAck thread }
}
```

Thus, if the Last Transmission Status is Normal, and the FIFO hasn't exceeded the Optimal FIFO, then the sender thread continues to form and send messages that will be described in more detail below. If, instead, the Last Transmission Status indicates that a retransmission is necessary, then the sender thread prepares a retransmission message that will be described in more detail below. Otherwise, if the FIFO exceeds the Optimal FIFO, then the sender thread stops forming and sending messages, and waits to be awoken.

Figure 11:
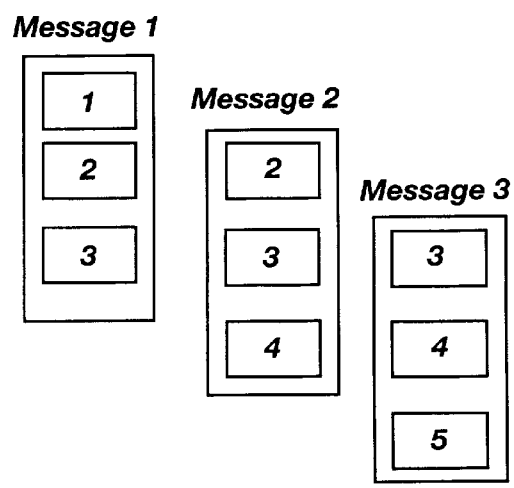
FIG. 11 is a diagram illustrating the format of messages in a UDP/IP version of the internet-based implementation of FIG. 10.

As shown in FIG. 11, the sender thread forms messages using a technique referred to as "forward error correction." In accordance with this technique, each of the messages (e.g., Message 1) consists of three data packets (e.g., "1", "2", and "3"). Each data packet is sent three times in three different but sequential messages, so that if two or fewer messages are lost, a data packet will still be received by the receiver thread without the need for retransmission (which will be described below). Of course, the number of packets in each message can be more or less than three, although varying this number will also vary the throughput required by the sender thread.

The three data packets in the messages shown are each 128 bytes long, and each of the messages (e.g., Message 1) contains a 12 byte header that contains the sequence numbers (e.g., "1", "2", "3") of the packets in the message. Thus, each message is a total of (128×3+12=396 bytes) long. This size has been selected to avoid, if possible, fragmentation of the messages by routers on the internet, since messages of more than 512 bytes are typically fragmented by internet routers. However, longer or shorter messages may be used in conjunction with this invention instead.

Pseudo-code for the receiver thread is as follows:

```
{   Backlog = 4.0;
    Get the Message;
    Pass Message packets to receiver buffers;
    Wake up consumer thread;
    if ((highest sequence # of Message packets received –
      Blocking Packet) ≧ Backlog)
    then { Send a retransmission request in the MessageAck with
      TYPE equal to 1; }
    else { Send Normal MessageAck with TYPE equal to 0; }
}
```

Thus, the receiver thread receives the messages and places them in its buffer for use by the consumer thread (described below). If necessary, the receiver thread wakes the consumer thread so it can retrieve and operate on the messages in the receiver buffer. Also, if a retransmission is necessary because a data packet was not received as the result of more than two consecutive messages being lost during transmission, the receiver thread requests a retransmission through the MessageAck, which is an acknowledgment message sent to the handleAck thread at the opposing end of the TCP acknowledgment connection 128.

The MessageAck includes three 4-byte sequence numbers followed by a 4-byte TYPE field. When transmission is successful, the three sequence numbers are the sequence numbers of the most recently received data packets, and the TYPE field is set to zero, indicating normal transmission. When transmission is unsuccessful, the first sequence number is the sequence number of the lost data packet, the latter two sequence numbers are the sequence numbers of the last two data packets received, and the TYPE field is set to 1, indicating a retransmission request. Of course, other formats for the MessageAck also fall within the scope of this invention.

Pseudo-code for the consumer thread is as follows:

```
{   Blocking Packet = 0;
    copy the blocking packet from the receiver buffers;
    while (the copied location in the receiver buffers is not a NULL)
    {
        set the copied location of the receiver buffers to NULL;
```

```
        increment Blocking Packet;
        Copy the new blocking packet from the receiver buffers;
    }
    sleep, waiting to be woken by the receiver thread;
}
```

"Blocking Packet" is the sequence number of the next data packet the consumer thread needs. The consumer thread works its way through the receiver buffers copying data packets until it encounters a NULL, at which time it sleeps until the receiver thread notifies it that more data packets have been received.

Finally, pseudo-code for the handleAck thread is as follows:

```
{   get the MessageAck from the receiver thread on the other end
of the UDP/IP connection;
    if (TYPE field of MessageAck is set to 1)
    then
    {   control transmission until the FIFO equals zero;
        inform the sender thread that Retransmission Needed;
        pass the sequence number to be retransmitted to the
            sender thread;
    }
    else
    {
        increment count of # Packets Delivered;
        inform the sender thread that last transmission was Normal;
    }
    if (FIFO < Optimal FIFO)
    then { wake up the sender thread }
}
```

Thus, the handleAck thread receives the messageAck from the receiver thread and, if a retransmission is requested, it zeroes out the FIFO and passes the necessary retransmission information to the sender thread. Otherwise, the handleAck thread updates the count of # Packets Delivered and informs the sender thread that the last transmission was normal. The handleAck thread is also responsible for waking up the sender thread when the sender thread has stopped transmitting because the FIFO has exceeded the Optimal FIFO.

Some examples of the operation of the sender, receiver, consumer, and handleAck threads should illustrate their features.

Figure 12A:
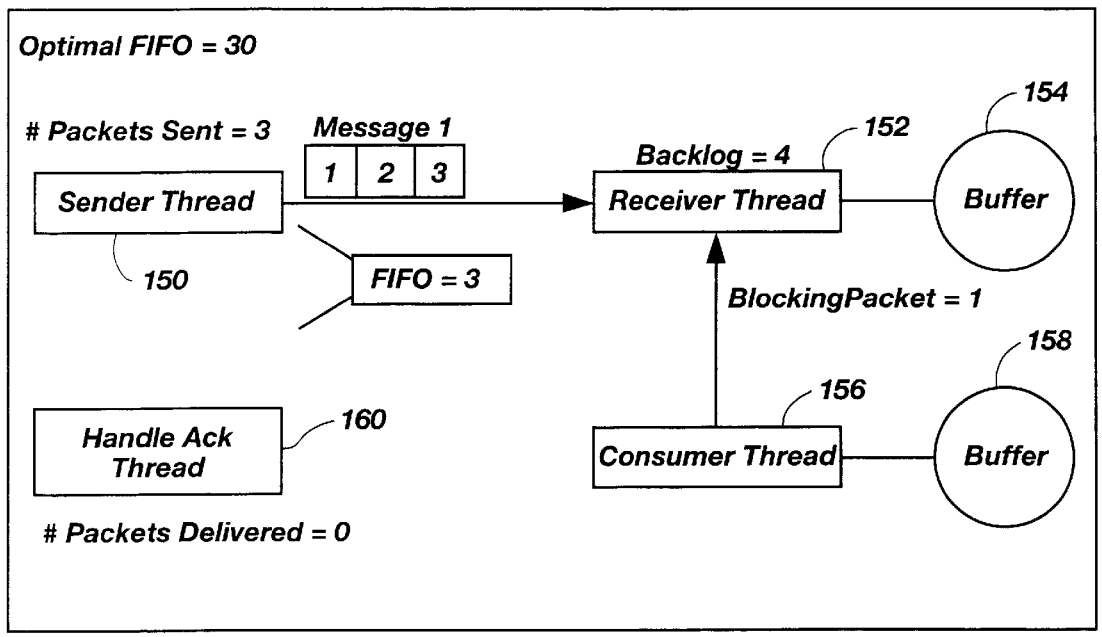
FIGS. 12A-M illustrate operation of the UDP/IP version of FIG. 11.

As shown in FIG. 12A, the sender thread 150 begins transmitting Message 1 containing data packets 1, 2, and 3 to the receiver thread 152, thereby causing the FIFO to increase to 3, which is well below the Optimal FIFO of 30. Upon transmitting Message 1, the sender thread 150 then updates the count of # Packets Sent to 3. Operation of the receiver thread 152, the receiver buffer 154, the consumer thread 156, the consumer buffer 158, and the handleAck thread 160 will be described below.

Figure 12B:
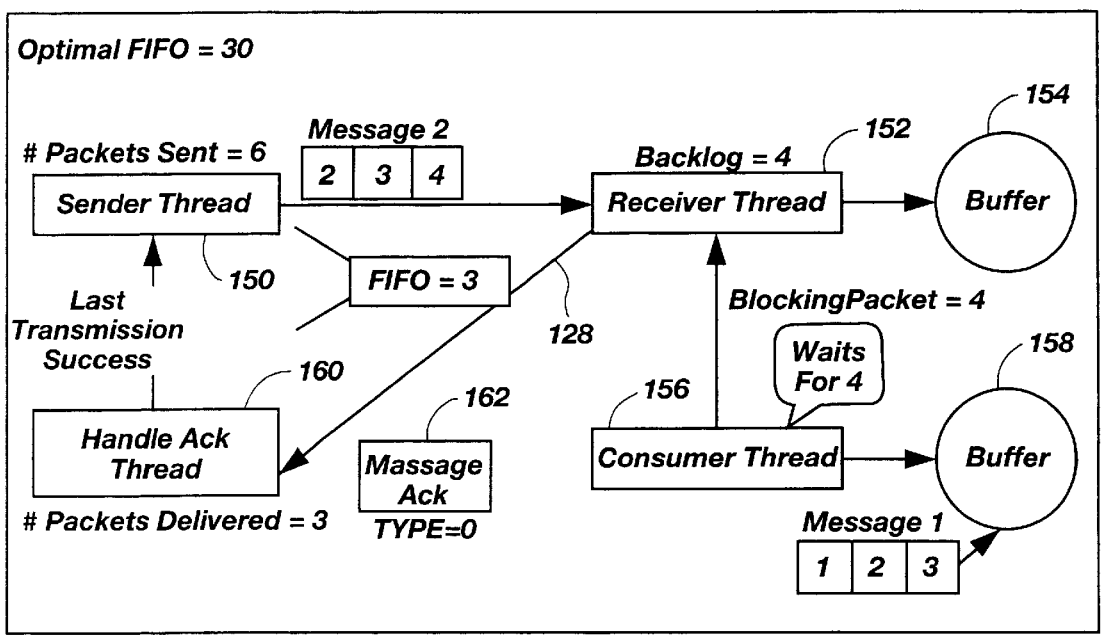

As shown in FIG. 12B, while Message 1 is being received by the receiver thread 152, the sender thread 150 sends Message 2, consisting of data packets 2, 3, and 4, and updates the count of # Packets Sent to 6. Meanwhile, the receiver thread 152 stores Message 1 into its own buffer 154 and informs the consumer thread 156 that a new Message has arrived. The receiver thread 152 also sends a MessageAck 162 over the TCP connection 128 (see also FIG. 10) with the sequence number of the packets received (i.e., packets 1, 2, and 3). The TYPE field of the MessageAck is set to zero because the difference between the highest sequence number received (i.e., 3) and Blocking Packet (1) is less than BACKLOG, indicating a successful transmission.

The consumer thread 156 copies packet numbers 1, 2, and 3 into its own buffer 158 and updates Blocking Packet to 4. It then waits for the receiver thread 152 to notify it that more data has been received. Meanwhile, the handleAck thread 160 receives the MessageAck 162 and updates the count of # Packets Delivered to 3. The handleAck thread 160 also informs the sender thread 150 that the last transmission was successful.

Figure 12C:
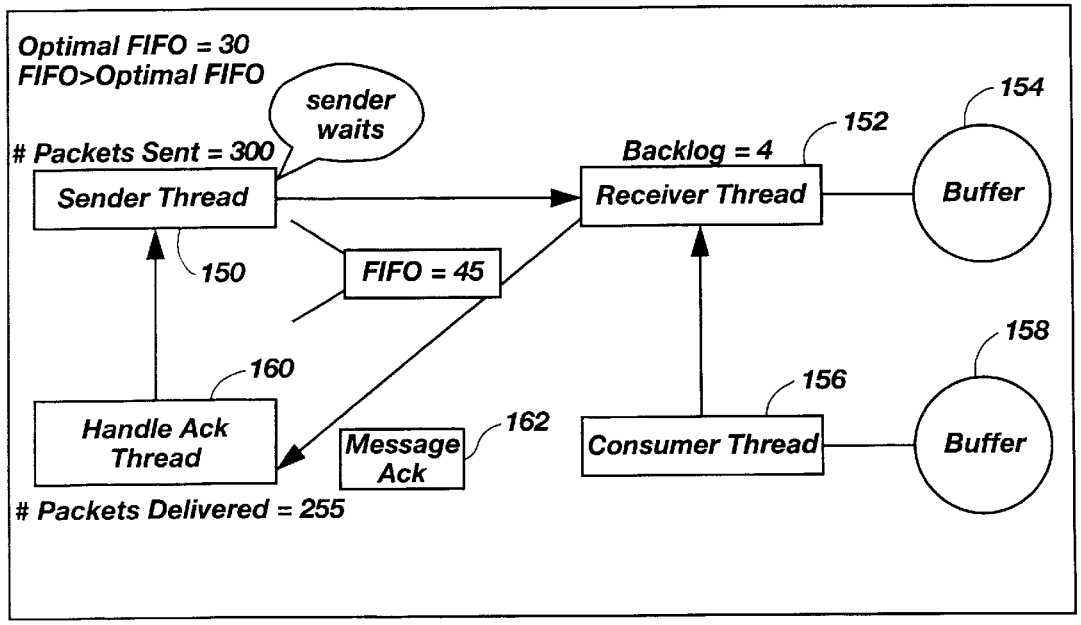

As shown in FIG. 12C, when the FIFO exceeds the Optimal FIFO, the sender thread 150 discontinues transmission and waits to be woken, while the receiver thread 152 continues to receive Messages and send MessageAcks 162. As a result, the count of the # Packets Delivered increases while the count of # Packets Sent remains the same, so the FIFO drops. When the FIFO drops below the Optimal FIFO, the handleAck thread 160 awakens the sender thread 150, which then begins transmitting Messages again.

Figure 12D:
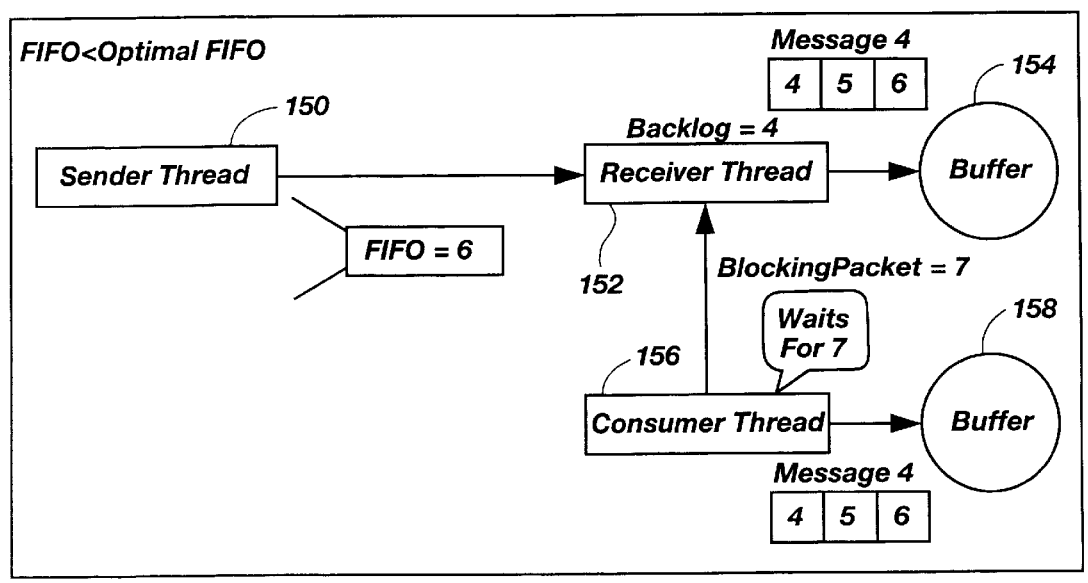
Figure 12E:
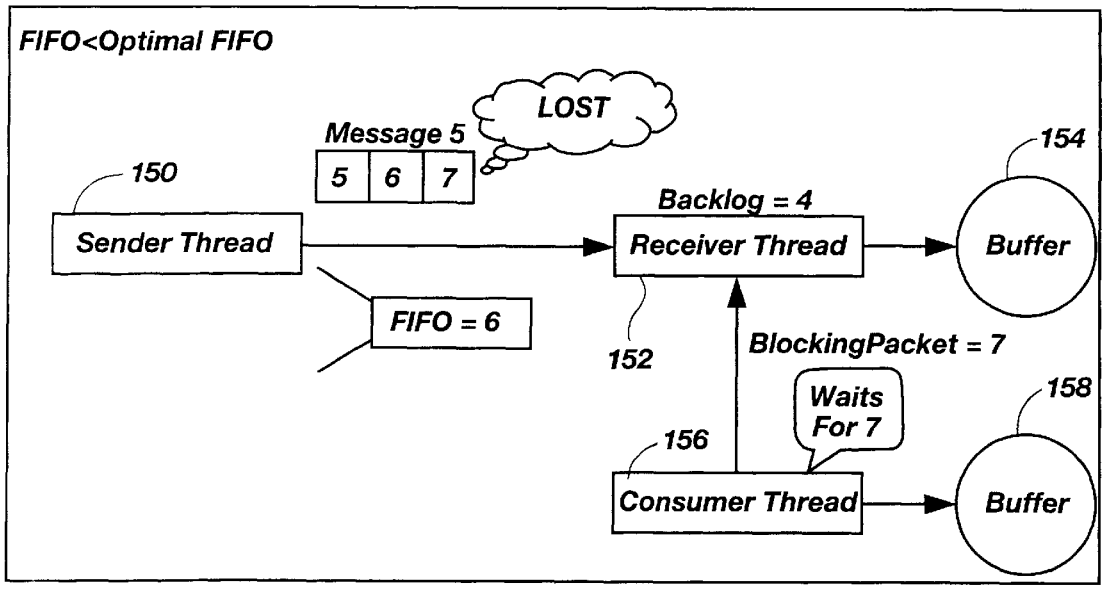
Figure 12F:
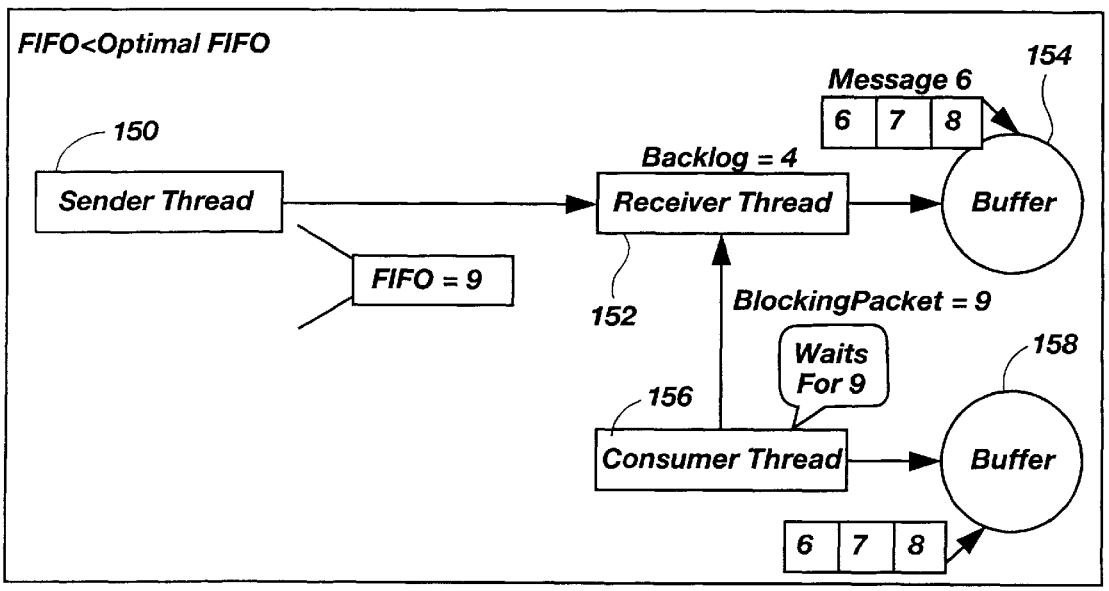
Figure 12G:
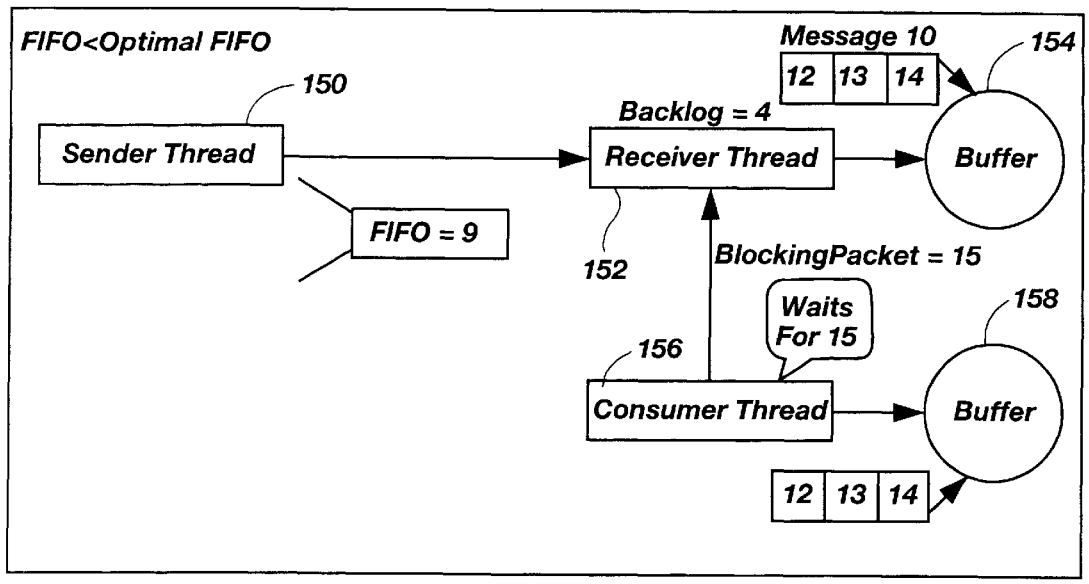
Figure 12H:
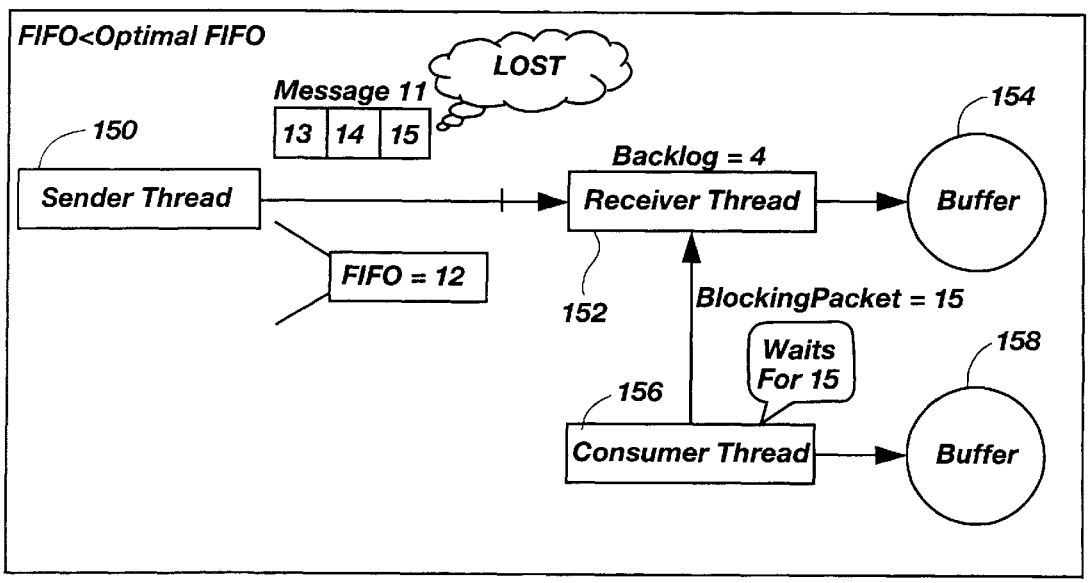
Figure 12I:
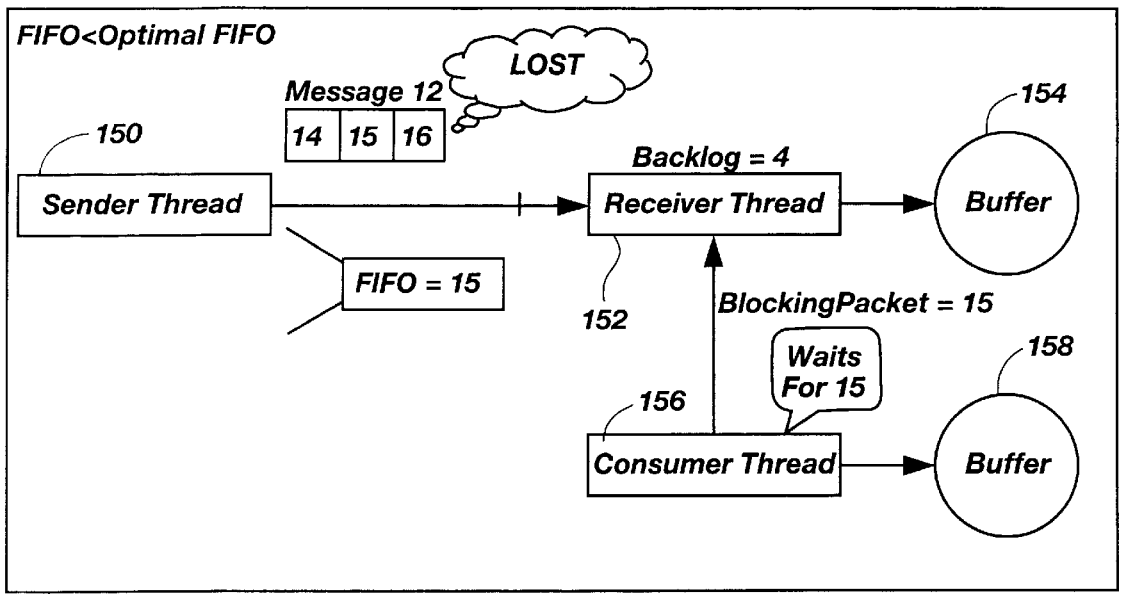
Figure 12J:
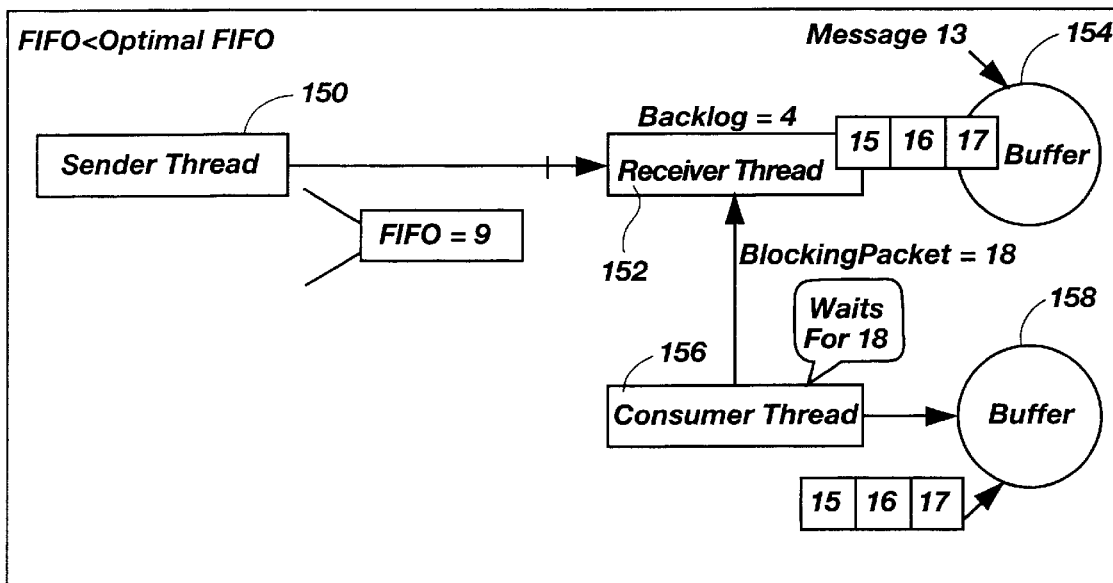

As shown in FIG. 12D, the sender thread 150 sends Message 4, consisting of data packets 4,5 and 6, the receiver thread 152 receives Message 4 and stores it in buffers 154, and the consumer thread 156 copies packets 4, 5, and 6 into its buffers 158 and waits for packet 7. As shown in FIG. 12E, it may happen that the next Message (e.g., Message 5) from the sender thread 150, consisting of packets 5,6 and 7, is lost during transmission over the internet. As shown in FIG. 12F, the receiver thread 152 has no way of knowing this, so it receives the next Message (e.g., Message 6) from the sender thread 150, consisting of packets 6, 7 and 8, and wakes up the consumer thread 156, which finds packet 7 in the receiver buffers 154 and copies it, along with packets 7 and 8, into its own buffers 158. As shown in FIG. 12G, the sender thread 150 transmits Message 10, consisting of packets 12,13 and 14, the receiver thread 152 receives Message 10, and the consumer thread 156 copies packets 12, 13, and 14 into its buffers 158 from the receiver buffers 154. The consumer thread 156 then waits for data packet 15. As shown in FIGS. 12H and 12I, it may happen that the next two Messages (e.g., Messages 11 and 12) from the sender thread 150, consisting of packets 13, 14 and 15 (FIG. 12H) and 14, 15 and 16 (FIG. 12I), are lost on the internet. As shown in FIG. 12J, the receiver thread 152 does not know of this loss, so it receives the next Message (e.g., Message 13) from the sender thread 150, consisting of packets 15, 16 and 17, and wakes up the consumer thread 156, which then finds packet 15 in the receiver buffers 154 and copies the packet to its own buffer 158, along with packets 16 and 17. The consumer thread 156 then waits for data packet 18. Thus, even though two consecutive messages were lost, the error is correct without the need for retransmission.

Figure 12K:
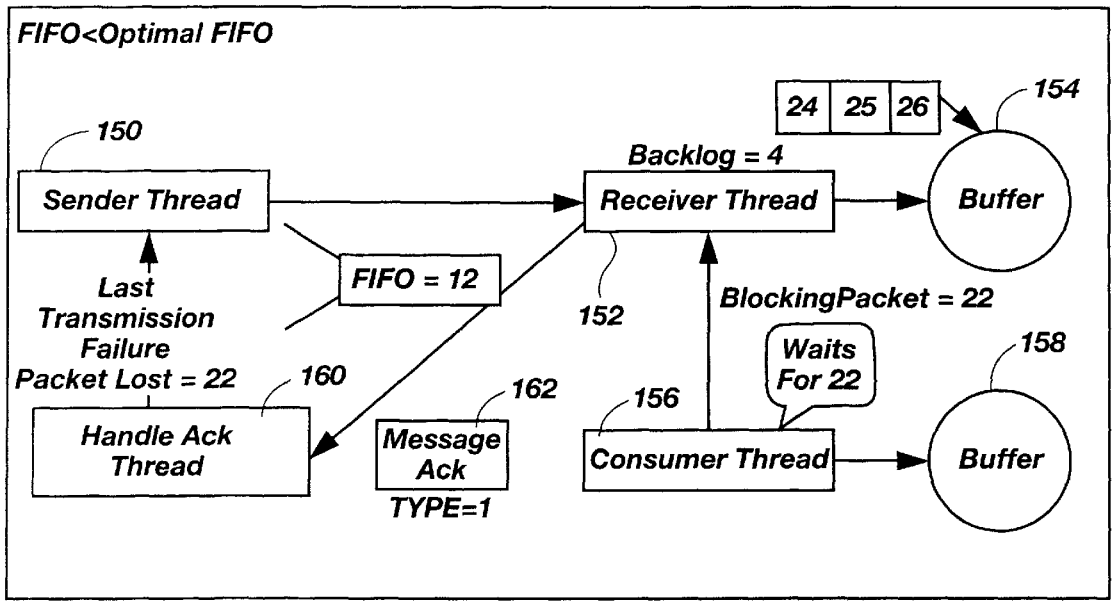
Figure 12L:
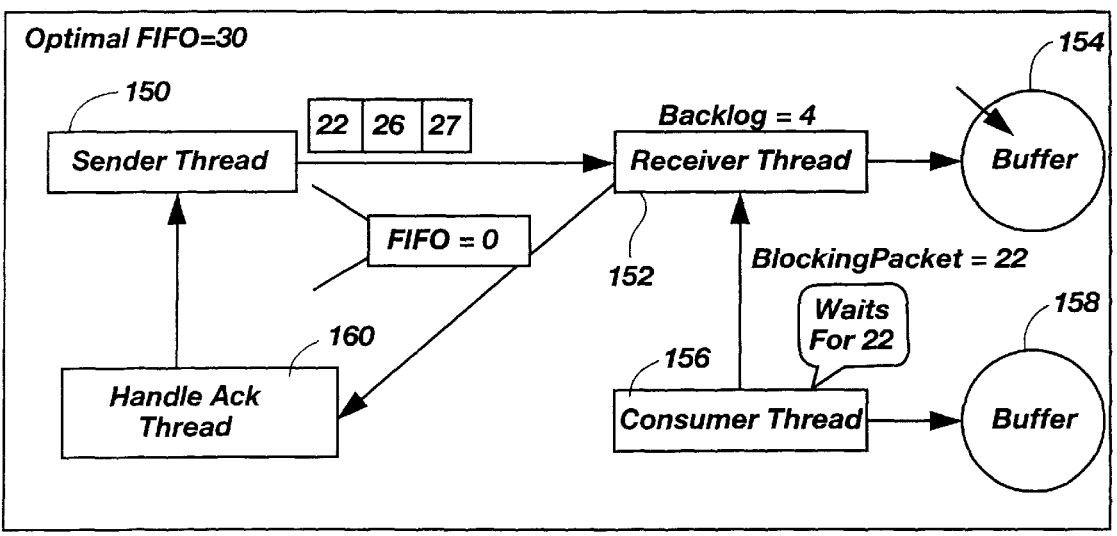
Figure 12M:
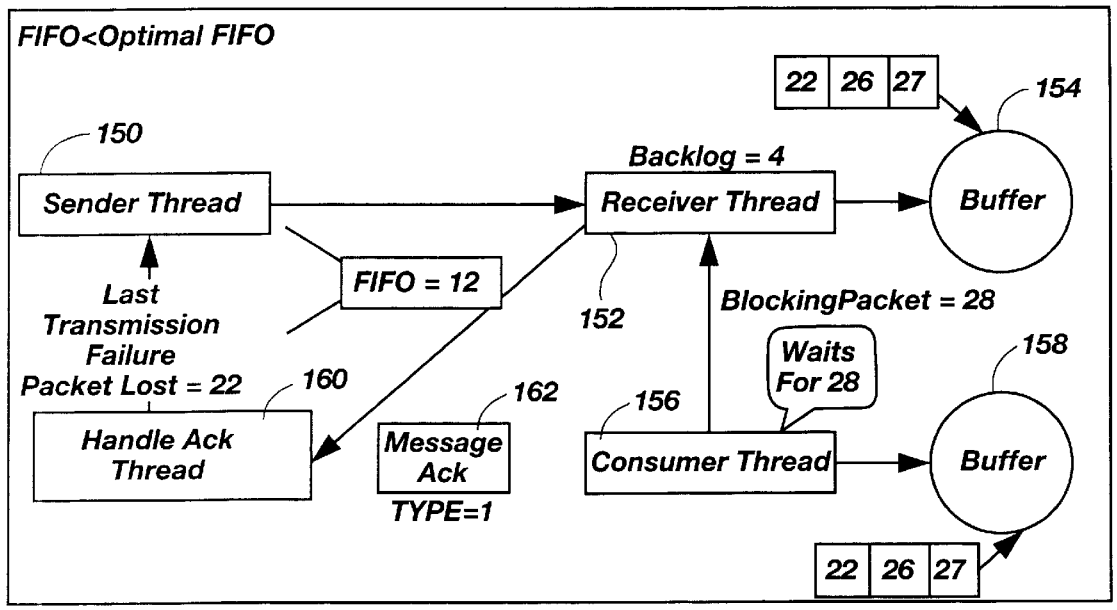

When more than two sequential messages are lost, though, retransmission is necessary. For example, as shown in FIG. 12K, the consumer thread 156 is waiting for packet 22. Three sequential Messages, consisting of packets (20, 21, and 22), (21, 22, and 23), and (22, 23, and 24), have been lost on the internet. Consequently, the next Messages the receiver thread 152 receives consist of data packets (23, 24, and 25) and (24, 25, and 26). Because the highest sequence number (i.e., 26) of the received packets less the Blocking Packet (i.e., 22) is equal to the BACKLOG (i.e., 4), the receiver thread 152 senses a packet loss and sends a MessageAck 162 that includes the BlockingPacket sequence number (i.e., 22) and has its TYPE field set to 1, denoting a retransmission request. The handleAck thread 160 receives this MessageAck 162 and informs the sender thread 150 that retransmission is needed. As shown in FIG. 12L, the sender thread 150 packs this packet (i.e., packet 22) in its next Message, along with packets 26 and 27, and sends this Message to the receiver thread 152. As shown in FIG. M, the receiver thread 152 receives the retransmitted packet (i.e., packet 22) and wakes up the consumer thread 156, which copies the packet to its buffer 158. As a result, the lost packet is restored.

Various experiments have shown the efficacy of the TCP/IP and UDP/IP implementations of this invention described above. The results of one such experiment, obtained using the system 120 of FIG. 10, are summarized in the following table.

TABLE 2

| TYPE OF COMMUNI-CATION | AVERAGE LATENCY WITHOUT LOW LATENCY PROTOCOL | AVERAGE LATENCY WITH LOW LATENCY PROTOCOL |
| --- | --- | --- |
| TCP | 800 ms | 120–180 ms |
| UDP | 700–800 ms | 100–150 ms |

Figure 13:
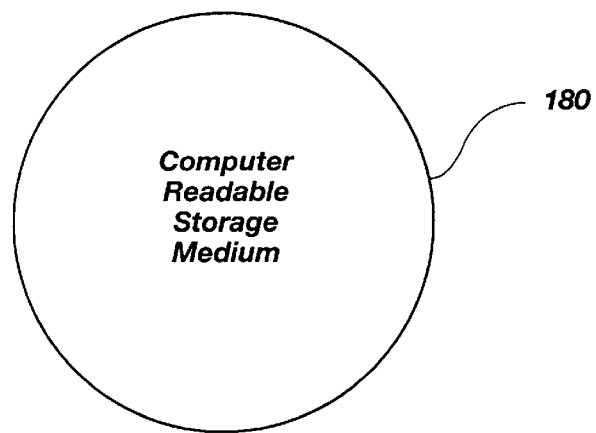
FIG. 13 is a diagram illustrating a computer-readable storage medium in accordance with this invention.

As shown in FIG. 13, all or portions of a program that causes a computer to operate in accordance with the methods, procedures, and processes of this invention can be stored on a computer-readable storage medium 180, such as, for example, a floppy disk, hard disk, CD-ROM, RAM memory, flash memory, ROM memory, and tape.

Although this invention has been described with reference to particular embodiments, the invention is not limited to these described embodiments. Rather, the invention is limited only by the appended claims, which include within their scope all equivalent devices and methods that operate according to the principles of the invention as described.

We claim:

1. A method of operating a communication system, the method comprising:

selecting a target amount of in-transit data with which the communication system is to be operated, wherein the target amount corresponds to a knee point in an average throughput versus average latency curve for the communication system;

transmitting data in the communication system;

receiving feedback from the communication system indicating the amount of in-transit data present therein resulting from the transmitting of data; and controlling the transmitting of data in the communication system in response to the received feedback so the amount of in-transit data present therein does not exceed the selected target amount of in-transit data.

2. The method of claim 1, wherein the communication system has a transmitting site and a receiving site, wherein the act of selecting a target amount of in-transit data comprises:

transmitting a block of substantially non-compressible data from the transmitting site to the receiving site;

measuring the amount of time that passes as the block is received at the receiving site and calculating the corresponding connection rate at which the block was received;

transmitting the calculated connection rate from the receiving site to the transmitting site;

controlling the transmitting of data from the transmitting site so the amount of in-transit data present therein substantially equals a temporary target;

transmitting a fixed amount of data from the transmitting site to the receiving site;

measuring the amount of time that passes as the fixed amount of data is received at the receiving site and calculating the corresponding throughput at which the block was received;

transmitting the calculated throughput from the receiving site to the transmitting site;

when the calculated throughput is substantially less than the calculated connection rate, increasing the temporary target by a fixed step amount and repeating the acts of controlling the transmitting of data from the transmitting site, transmitting a fixed amount of data, measuring the amount of time that passes as the fixed amount of data is received, and transmitting the calculated throughput from the receiving site to the transmitting site;

when the calculated throughput is substantially equal to the calculated connection rate and is different than the calculated throughput previously achieved with the temporary target reduced by the fixed step amount, reducing the temporary target by the fixed step amount and repeating the acts of controlling the transmitting of data from the transmitting site, transmitting a fixed amount of data, measuring the amount of time that passes as the fixed amount of data is received, and transmitting the calculated throughput from the receiving site to the transmitting site; and when the calculated throughput is at least 95% of the calculated connection rate and is substantially the same as the calculated throughput previously achieved with the temporary target reduced by the fixed step amount, setting the target amount of in-transit data equal to the temporary target.

3. The method of claim 1, wherein the communication system has a transmitting site and a receiving site, wherein the method further comprises the act of synchronizing the transmitting and receiving sites, the act of synchronizing comprising:

exchanging random numbers between the transmitting and receiving sites to elect one master and the other slave;

transmitting a fixed amount of data from the master to the slave and retransmitting the fixed amount of data from the slave to the master;

calculating the round-trip time of the fixed amount of data from the master to the slave and back;

transmitting the fixed amount of data again from the master to the slave;

when a time equal to one-half the calculated round-trip time has passed since transmitting the fixed amount of data again, marking the current time at the master as a reference time of the master; and when the slave receives the fixed amount of data again, marking the current time at the slave as a reference time of the slave.

4. The method of claim 1, wherein the act of transmitting data in the communication system includes transmitting data via at least one of a modem, a telephone line, switching equipment, an internet router, a cable line, cellular equipment, a satellite, a T1 line, a TCP/IP connection, and a UDP/IP connection, wherein the act of transmitting data further includes at least one of packetizing the data and repeating the data in a fixed number of sequential transmissions in accordance with a forward error correction scheme.

5. The method of claim 1, wherein the act of receiving feedback includes at least one of receiving acknowledgement and timing tokens appended to data packets via a telephone line, receiving acknowledgment and timing tokens identified by escape characters in a contiguous data stream via a telephone line, and receiving acknowledgment messages in accordance with a forward error correction and retransmission scheme via an internet-based TCP connection.

6. The method of claim 1, wherein the acts of transmitting data, receiving feedback, and controlling the transmitting of data are performed by one or more computer software threads.

7. The method of claim 1, wherein the act of transmitting data includes the act of retransmitting data in accordance with a retransmission scheme.

8. The method of claim 1, wherein the act of controlling the transmitting of data includes at least one of advancing and delaying the transmitting of data in response to the received feedback.

9. The method of claim 1, wherein the communication system has at least first and second virtual channels, wherein the acts of selecting a target amount, transmitting data, receiving feedback, and controlling the transmitting of data are performed with respect to the first virtual channel, wherein the method further comprises:

selecting a target amount of in-transit data with which the second virtual channel of the communication system is to be operated;

transmitting data in the second virtual channel of the communication system;

receiving feedback from the second virtual channel of the communication system indicating the amount of in-transit data present therein resulting from the transmitting of data; and controlling the transmitting of data in the second virtual channel of the communication system in response to the received feedback so the amount of in-transit data present therein does not exceed the target amount of in-transit data selected for the second virtual channel.

10. The method of claim 9, wherein the acts of transmitting data in the first and second virtual channels includes the act of scheduling the transmission of data in the first and second virtual channels in accordance with delay cost functions associated with the first and second virtual channels.

11. The method of claim 10, further comprising the act of dynamically adjusting the delay cost functions.

12. The method of claim 1, wherein the communication system has first and second distinct communication channels, wherein the first and second distinct communication channels are one of physically distinct channels and distinct virtual channels, wherein the act of transmitting data includes transmitting data via the first communication channel, wherein the act of receiving feedback includes receiving feedback via the second communication channel.

13. A computer-readable storage medium upon which is stored a program for causing an electronic system to operate in accordance with a method of operating a communication system, the method comprising:

selecting a target amount of in-transit data with which the communication system is to be operated, wherein the target amount corresponds to a knee point in an average throughput versus average latency curve for the communication system;

transmitting data in the communication system;

receiving feedback from the communication system indicating the amount of in-transit data present therein resulting from the transmitting of data; and controlling the transmitting of data in the communication system in response to the received feedback so the amount of in-transit data present therein does not exceed the selected target amount of in-transit data.

14. The computer-readable storage medium of claim 13, wherein the computer-readable storage medium is selected from a group comprising a floppy disk, a hard disk, a CD-ROM, a RAM memory, a ROM memory, a flash memory, and a tape.

15. A communication system comprising a transmitting site, a receiving site, and a communication channel operatively coupling the transmitting and receiving sites for communication therebetween, wherein the transmitting site includes:

a device for transmitting data to the receiving site via the communication channel; and a device operatively coupled to the data transmitting device and adapted to select a target amount of in-transit data with which the communication system is to be operated, to receive feedback from the receiving site indicating the amount of in-transit data present in the communication system resulting from the transmitting of data, and to control the transmitting of data via the communication channel in response to the received feedback so the amount of in-transit data present in the communication system does not exceed the selected target amount of in-transit data;

wherein the target amount of in-transit data corresponds to a knee point in an average throughput versus average latency curve for the communication channel; and wherein the receiving site includes a device for transmitting the feedback to the transmitting site.

16. The communication system of claim 15, wherein the transmitting and receiving sites comprise computers.

17. The communication system of claim 15, wherein the communication channel includes at least one of a modem, a telephone line, switching equipment, an internet router, a cable line, cellular equipment, a satellite, a T1 line, a TCP/IP connection, and a UDP/IP connection.

18. The communication system of claim 15, wherein the device for transmitting data comprises a modem.

19. The communication system of claim 15, wherein the device adapted to select a target amount of in-transit data, to receive feedback, and to control the transmitting of data is adapted in accordance with a computer program for execution on the transmitting site.

20. In a communication system having a receiving site and a communication channel, an electronic system comprising:

a device for transmitting data to the receiving site via the communication channel; and a device operatively coupled to the data transmitting device and adapted to select a target amount of in-transit data with which the communication system is to be operated, to receive feedback from the receiving site indicating the amount of in-transit data present in the communication system resulting from the transmitting of data, and to control the transmitting of data via the communication channel in response to the received feedback so the amount of in-transit data present in the communication system does not exceed the selected target amount of in-transit data; and wherein the target amount of in-transit data corresponds to a knee point in an average throughput versus average latency curve for the communication channel.

21. A method of operating a communication system, wherein the communication system has a transmitting site and a receiving site, the method comprising:

selecting a target amount of in-transit data with which the communication system is to be operated; wherein the act of selecting a target amount of in-transit data comprises:
  transmitting a block of substantially non-compressible data from the transmitting site to the receiving site;
  measuring the amount of time that passes as the block is received at the receiving site and calculating the corresponding connection rate at which the block was received;
  transmitting the calculated connection rate from the receiving site to the transmitting site;
  controlling the transmitting of data from the transmitting site so the amount of in-transit data present therein substantially equals a temporary target;
  transmitting a fixed amount of data from the transmitting site to the receiving site;
  measuring the amount of time that passes as the fixed amount of data is received at the receiving site and calculating the corresponding throughput at which the block was received;
  transmitting the calculated throughput from the receiving site to the transmitting site;
  when the calculated throughput is substantially less than the calculated connection rate, increasing the temporary target by a fixed step amount and repeating the acts of controlling the transmitting of data from the transmitting site, transmitting a fixed amount of data, measuring the amount of time that passes as the fixed amount of data is received, and transmitting the calculated throughput from the receiving site to the transmitting site;
  when the calculated throughput is substantially equal to the calculated connection rate and is different than the calculated throughput previously achieved with the temporary target reduced by the fixed step amount, reducing the temporary target by the fixed step amount and repeating the acts of controlling the transmitting of data from the transmitting site, transmitting a fixed amount of data, measuring the amount of time that passes as the fixed amount of data is received, and transmitting the calculated throughput from the receiving site to the transmitting site; and
  when the calculated throughput is at least 95% of the calculated connection rate and is substantially the same as the calculated throughput previously achieved with the temporary target reduced by the fixed step amount, setting the target amount of in-transit data equal to the temporary target;
transmitting data in the communication system;
receiving feedback from the communication system indicating the amount of in-transit data present therein resulting from the transmitting of data; and
controlling the transmitting of data in the communication system in response to the received feedback so the amount of in-transit data present therein does not exceed the selected target amount of in-transit data.

22. A method of operating a communication system, wherein the communication system has a transmitting site and a receiving site, the method comprising:
  selecting a target amount of in-transit data with which the communication system is to be operated;
  transmitting data in the communication system;
  receiving feedback from the communication system indicating the amount of in-transit data present therein resulting from the transmitting of data;
  controlling the transmitting of data in the communication system in response to the received feedback so the amount of in-transit data present therein does not exceed the selected target amount of in-transit data; and
  synchronizing the transmitting and receiving sites, the act of synchronizing comprising:
    exchanging random numbers between the transmitting and receiving sites to elect one master and the other slave;
    transmitting a fixed amount of data from the master to the slave and retransmitting the fixed amount of data from the slave to the master;
    calculating the round-trip time of the fixed amount of data from the master to the slave and back;
    transmitting the fixed amount of data again from the master to the slave;
    when a time equal to one-half the calculated round-trip time has passed since transmitting the fixed amount of data again, marking the current time at the master as a reference time of the master; and
    when the slave receives the fixed amount of data again, marking the current time at the slave as a reference time of the slave.

23. A method of operating a communication system, the method comprising:
  selecting a target amount of in-transit data with which the communication system is to be operated;
  transmitting data in the communication system;
  receiving feedback from the communication system indicating the amount of in-transit data present therein resulting from the transmitting of data, wherein the act of receiving feedback includes at least one of receiving acknowledgment and timing tokens appended to data packets via a telephone line, receiving acknowledgment and timing tokens identified by escape characters in a contiguous data stream via a telephone line, and receiving acknowledgment messages in accordance with a forward error correction and retransmission scheme via an internet-based TCP connection; and
  controlling the transmitting of data in the communication system in response to the received feedback so the amount of in-transit data present therein does not exceed the selected target amount of in-transit data.

24. A method of operating a communication system, wherein the communication system has at least first and second virtual channels, the method comprising:
  selecting a target amount of in-transit data with which the communication system is to be operated;
  transmitting data in the communication system;
  receiving feedback from the communication system indicating the amount of in-transit data present therein resulting from the transmitting of data;
  controlling the transmitting of data in the communication system in response to the received feedback so the amount of in-transit data present therein does not exceed the selected target amount of in-transit data
  wherein the acts of selecting a target amount, transmitting data, receiving feedback, and controlling the transmitting of data are performed with respect to the first virtual channel;
  selecting a target amount of in-transit data with which the second virtual channel of the communication system is to be operated;
  transmitting data in the second virtual channel of the communication system;

receiving feedback from the second virtual channel of the communication system indicating the amount of in-transit data present therein resulting from the transmitting of data; and controlling the transmitting of data in the second virtual channel of the communication system in response to the received feedback so the amount of in-transit data present therein does not exceed the target amount of in-transit data selected for the second virtual channel.

25. The method of claim 24, wherein the acts of transmitting data in the first and second virtual channels includes the act of scheduling the transmission of data in the first and second virtual channels in accordance with delay cost functions associated with the first and second virtual channels.

26. The method of claim 25, further comprising the act of dynamically adjusting the delay cost functions.

27. A method of communicating data over a communication channel, comprising:

measuring a connection rate of said communication channel;

determining an optimal in-transit data size for said communication channel comprising:
(a) measuring current throughput for current in-transit data size;
(b) incrementing said current in-transit data size if said measured current throughput is less than a pre-selected percentage of said measured connection rate;
(c) assigning said current in-transit data size to said optimal in-transit data size if said measured current throughput is greater than a pre-selected percentage of said measured connection rate and previous measured throughput is the same as the current throughput;
(d) decrementing said current in-transit data size if said measured current throughput is greater than said pre-selected percentage of said measured connection rate and said optimal in-transit data size has not been assigned;
repeating steps (a) through (d) if said optimal in-transit data size has not been assigned; estimating in-transit data size; and adjusting actual in-transit data size using said estimated in-transit data size and said optimal in-transit data size.

28. The method of claim 27, wherein said measuring a connection rate of said communication channel includes:

sending a block of substantially non-compressible data across said communication channel;

measuring a time from beginning to end of receiving said block of substantially non-compressible data; and computing said connection rate from said measured time and data block size.

29. The method of claim 27, wherein said estimating in-transit data size includes:

packetizing said data stream;

transmitting said packets across said communication channel while tracking quantity and timing of packets transmitted;

receiving said transmitted packets and tracking quantity and timing of said packets received;

returning said quantity and timing of said packets received; and estimating in-transit data size from said quantity and timing of packets transmitted and from said quantity and timing of said packets received.

30. The method of claim 27, wherein adjusting said actual in-transit data size using said estimated in-transit data size and said optimal in-transit data size includes:

establishing a window centered around said optimal in-transit data size with upper and lower limits for said window;

delaying transmission of a next packet by D seconds if said estimated in-transit data size is greater than said upper limit; and advancing transmission of a next packet by A seconds if said estimated in-transit data size is less than said lower limit.

31. The method of claim 30, wherein D is defined as a difference between said estimated in-transit data size and said optimal in-transit data size, said difference divided by said connection rate.

32. The method of claim 30, wherein A is defined as a difference between said optimal in-transit data size and said estimated in-transit data size, said difference divided by said connection rate.

* * * * *

UNITED STATES PATENT AND TRADEMARK OFFICE
CERTIFICATE OF CORRECTION

PATENT NO.     : 6,141,324
DATED          : October 31, 2000
INVENTOR(S)    : Ben Abbot, Rajesh Chhabria and Abhijit Dey It is certified that error appears in the above-identified patent and that said Letters Patent is hereby corrected as shown below:

<u>Column 4,</u>
Line 13, change "inventors'low" to -- inventors' low --

<u>Column 8,</u>
Line 27, change "FIFO) + Connection" to -- FIFO) ÷ Connection --

Signed and Sealed this

Fifteenth Day of July, 2003

JAMES E. ROGAN
*Director of the United States Patent and Trademark Office*